United States Patent
Choi et al.

(10) Patent No.: US 10,227,006 B2
(45) Date of Patent: Mar. 12, 2019

(54) USER INTERFACE APPARATUS FOR VEHICLE AND VEHICLE

(71) Applicant: LG Electronics, Inc., Seoul (KR)

(72) Inventors: Sunghwan Choi, Seoul (KR); Dukyung Jung, Seoul (KR); Ilwan Kim, Seoul (KR); Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/861,458

(22) Filed: Jan. 3, 2018

(65) Prior Publication Data

US 2018/0201134 A1    Jul. 19, 2018

(30) Foreign Application Priority Data

Jan. 17, 2017 (KR) .................. 10-2017-0008271

(51) Int. Cl.
*B60R 1/00* (2006.01)
*B60K 35/00* (2006.01)
*G06T 17/05* (2011.01)

(52) U.S. Cl.
CPC ............ *B60K 35/00* (2013.01); *B60R 1/00* (2013.01); *G06T 17/05* (2013.01); *B60K 2350/106* (2013.01); *B60K 2350/1084* (2013.01); *B60K 2350/1096* (2013.01); *B60K 2350/2017* (2013.01); *B60K 2350/2065* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2007/0126732 A1* | 6/2007 | Robertson | ............. | G06T 15/503 345/419 |
| 2008/0219493 A1* | 9/2008 | Tadmor | ..................... | G06T 1/00 382/100 |
| 2009/0299622 A1* | 12/2009 | Denaro | ................... | G01C 21/32 701/533 |
| 2013/0332871 A1* | 12/2013 | Bucur | ..................... | G06T 19/00 715/768 |
| 2017/0089710 A1* | 3/2017 | Slusar | ........................ | B60R 1/00 |
| 2018/0090002 A1* | 3/2018 | Arita | .................. | G08G 1/09675 |
| 2018/0157037 A1* | 6/2018 | Kasazumi | ........... | G02B 27/0101 |

FOREIGN PATENT DOCUMENTS

| | | |
|---|---|---|
| JP | 2006251000 A | 9/2006 |
| JP | 2013047066 A | 3/2013 |
| JP | 2015034945 | 2/2015 |

(Continued)

OTHER PUBLICATIONS

International Search Report in International Application No. PCT/KR2018/000597, dated May 31, 2018.

*Primary Examiner* — Frank S Chen
(74) *Attorney, Agent, or Firm* — Fish & Richardson P.C.

(57) ABSTRACT

Disclosed is a user interface apparatus for a vehicle, including: an interface unit; a display unit configured to implement multiple display layers each having a different virtual difference; and a processor configured to receive driving situation information of the vehicle through the interface unit, and control the display unit to vary a virtual distance of each of the multiple display layers.

17 Claims, 29 Drawing Sheets

(56) References Cited

FOREIGN PATENT DOCUMENTS

| | | |
|---|---|---|
| JP | 2015146012 A | 8/2015 |
| JP | 2015160572 | 9/2015 |
| JP | 2016102966 | 6/2016 |
| JP | 2016117345 | 6/2016 |
| KR | 20130062523 A | 6/2013 |
| KR | 1020150056715 | 5/2015 |
| KR | 20160139748 A | 12/2016 |
| WO | WO2014129017 A | 2/2017 |

* cited by examiner

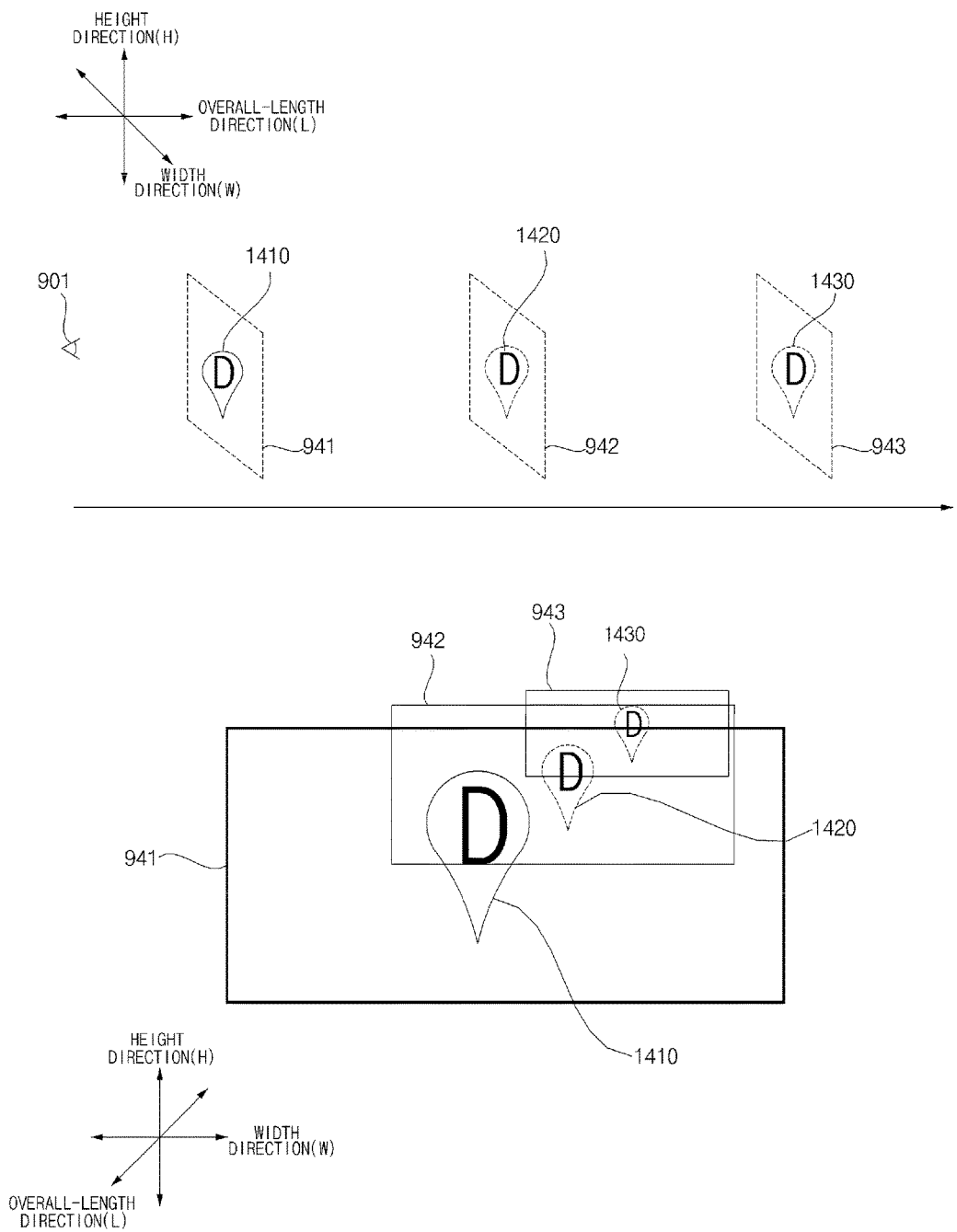

USER INTERFACE APPARATUS FOR VEHICLE AND VEHICLE

CROSS-REFERENCE TO RELATED APPLICATION

This application claims the priority benefit of Korean Patent Application No. 10-2017-0008271, filed on Jan. 17, 2017 in the Korean Intellectual Property Office, the disclosure of which is incorporated herein by reference.

BACKGROUND OF THE INVENTION

1. Field of the invention

The present invention relates to a user interface apparatus for a vehicle, and a vehicle.

2. Description of the Related Art

A vehicle is an apparatus that moves in a direction desired by a user riding therein. A representative example of a vehicle may be an automobile.

Meanwhile, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

Recently, a vehicle user interface apparatus includes a Head Up Display (HUD) which displays a graphic object using Augmented Reality (AR) technology.

The HUD provided inside a vehicle implements a single display layer having a predetermined virtual distance and provide fragmented information.

As traffic systems become increasingly complex and a user should recognize more and more information, there is need for a technology that enables providing such information to the user efficiently. However, a single display layer is not enough to provide the information efficiently.

SUMMARY OF THE INVENTION

The present invention has been made in view of the above problems, and it is one object of the present invention to provide a user interface apparatus for a vehicle, by which information is efficiently provided to a user.

It is another object of the present invention to provide a vehicle comprising a user interface apparatus.

Objects of the present invention should not be limited to the aforementioned objects and other unmentioned objects will be clearly understood by those skilled in the art from the following description.

In accordance with an embodiment of the present invention, the above and other objects can be accomplished by the provision of a user interface apparatus for a vehicle, including: an interface unit; a display unit configured to implement multiple display layers each having a different virtual distance; and a processor configured to receive driving situation information of the vehicle through the interface unit, and control the display unit to vary a virtual distance of each of the multiple display layers based on the driving situation information.

The details of other embodiments are included in the following description and the accompanying drawings.

The embodiments of the present invention have one or more effects as follows.

First, by implementing multiple display layers, it is possible to three-dimensionally provide information to a user.

Second, by varying a virtual distance of a display layer, it is possible to provide a three-dimensional effect and a spatial impression to information by using augmented reality.

Third, to address the problem that a fixed virtual distance according to an existing technology provides a weak sense of reality and causes fatigue to a driver, multiple display layers are implemented and a virtual distance is varied, thereby enhancing a sense of reality and reducing fatigue of the driver.

Fourth, by applying an out-of-focus effect and a fade-in/fade-out effect to contents, it is possible to help a user intuitively recognize an importance level of information and a distance to an object corresponding to the information.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein:

FIGS. 14A to 14C are diagrams for explanation of a fade-in/fade-out effect according to an embodiment of the present invention.

DETAILED DESCRIPTION OF THE EMBODIMENTS

Figure 1:
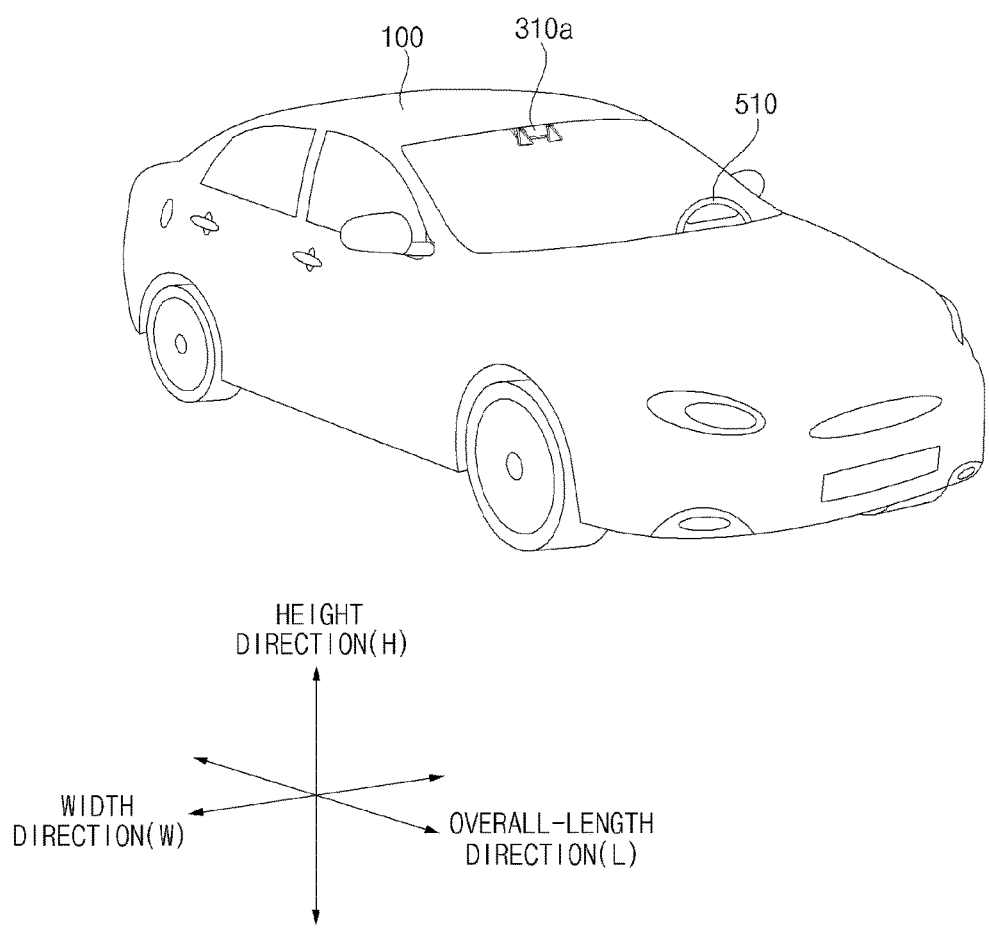
FIG. 1 is a diagram illustrating the external appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram of the external appearance of a vehicle according to an embodiment of the present invention.

Figure 2:
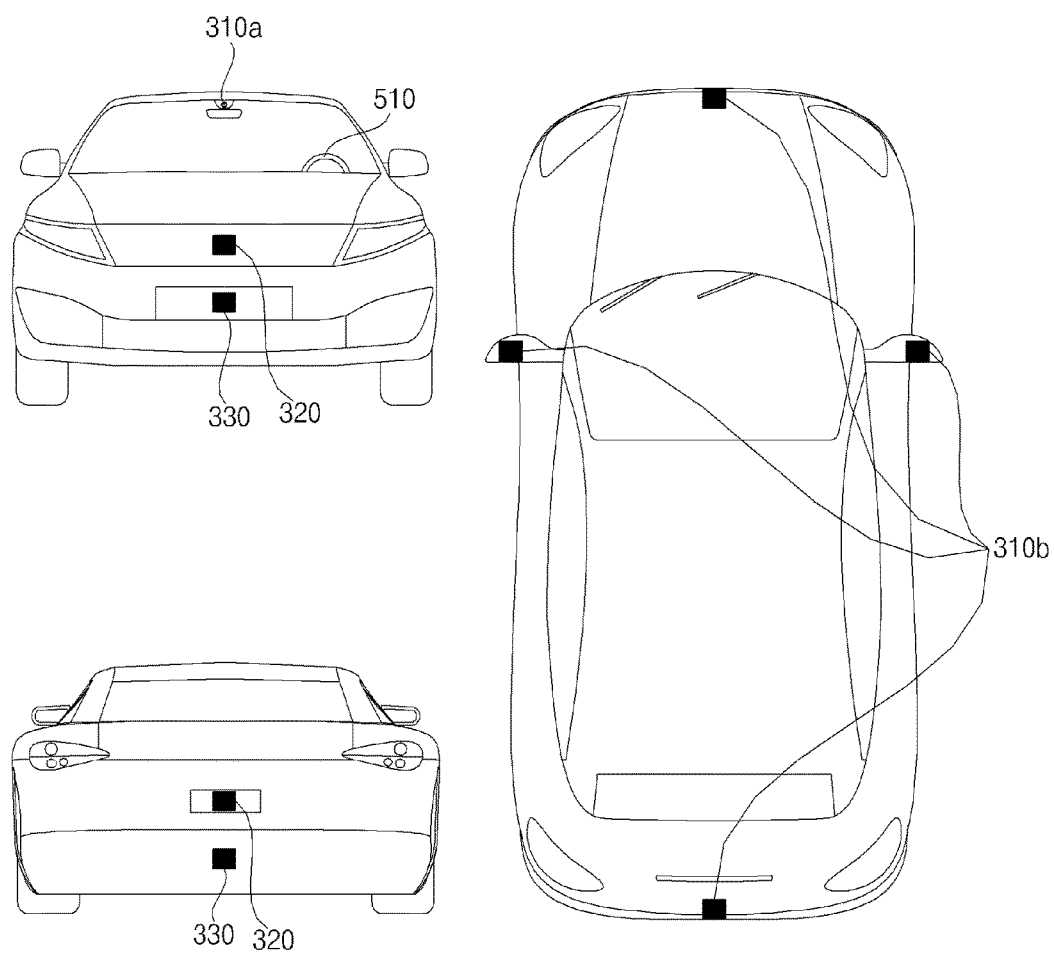
FIG. 2 are different angled views of the external appearance of a vehicle according to an embodiment of the present invention.

FIG. 2 is different angled views of a vehicle according to an embodiment of the present invention.

Figure 3:
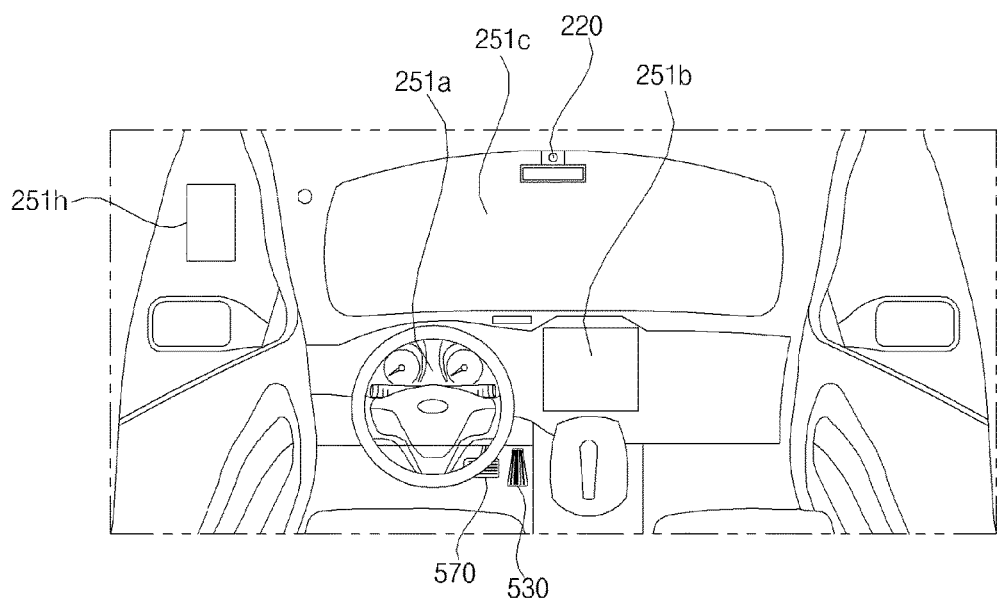
FIGS. 3 and 4 are diagrams illustrating the interior configuration of a vehicle according to an embodiment of the present invention.
Figure 4:
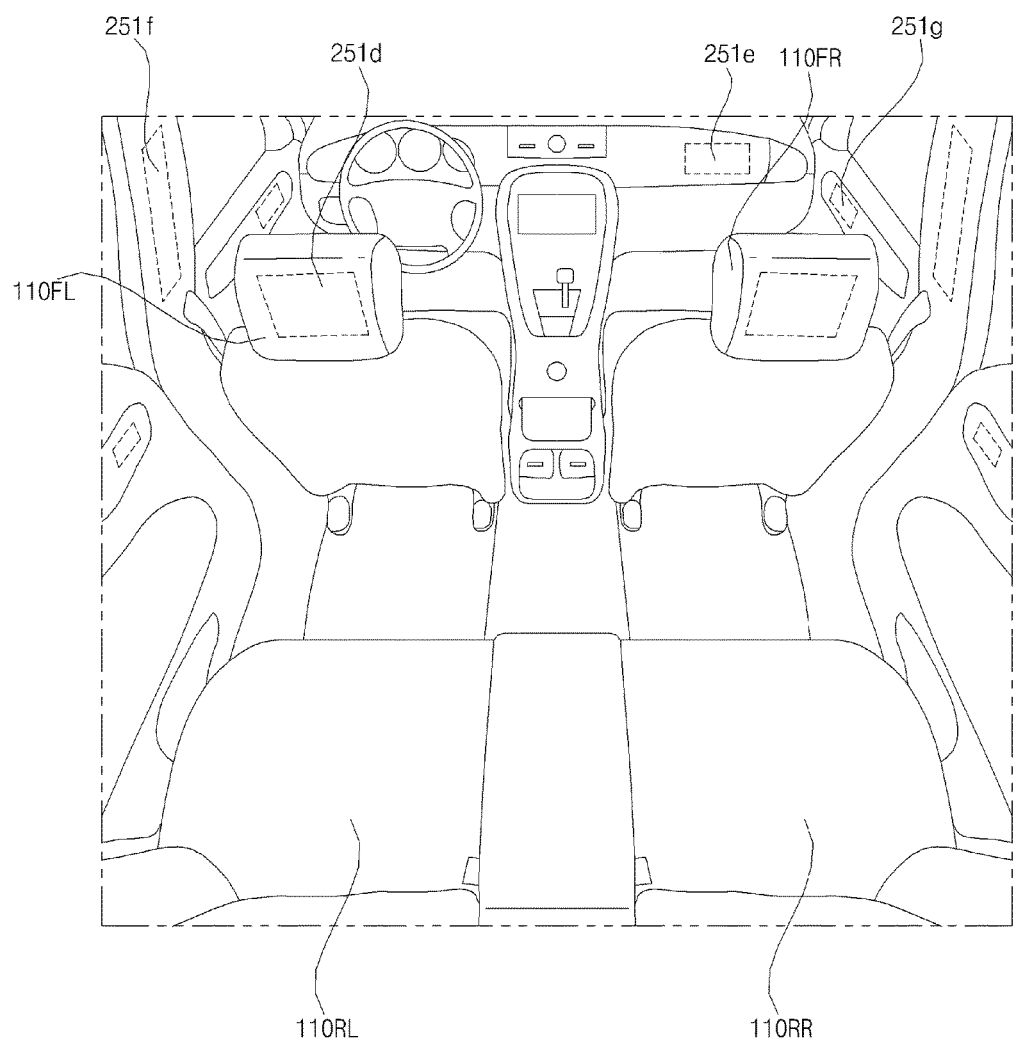

FIGS. 3 and 4 are diagrams of the internal configuration of a vehicle according to an embodiment of the present invention.

Figure 5:
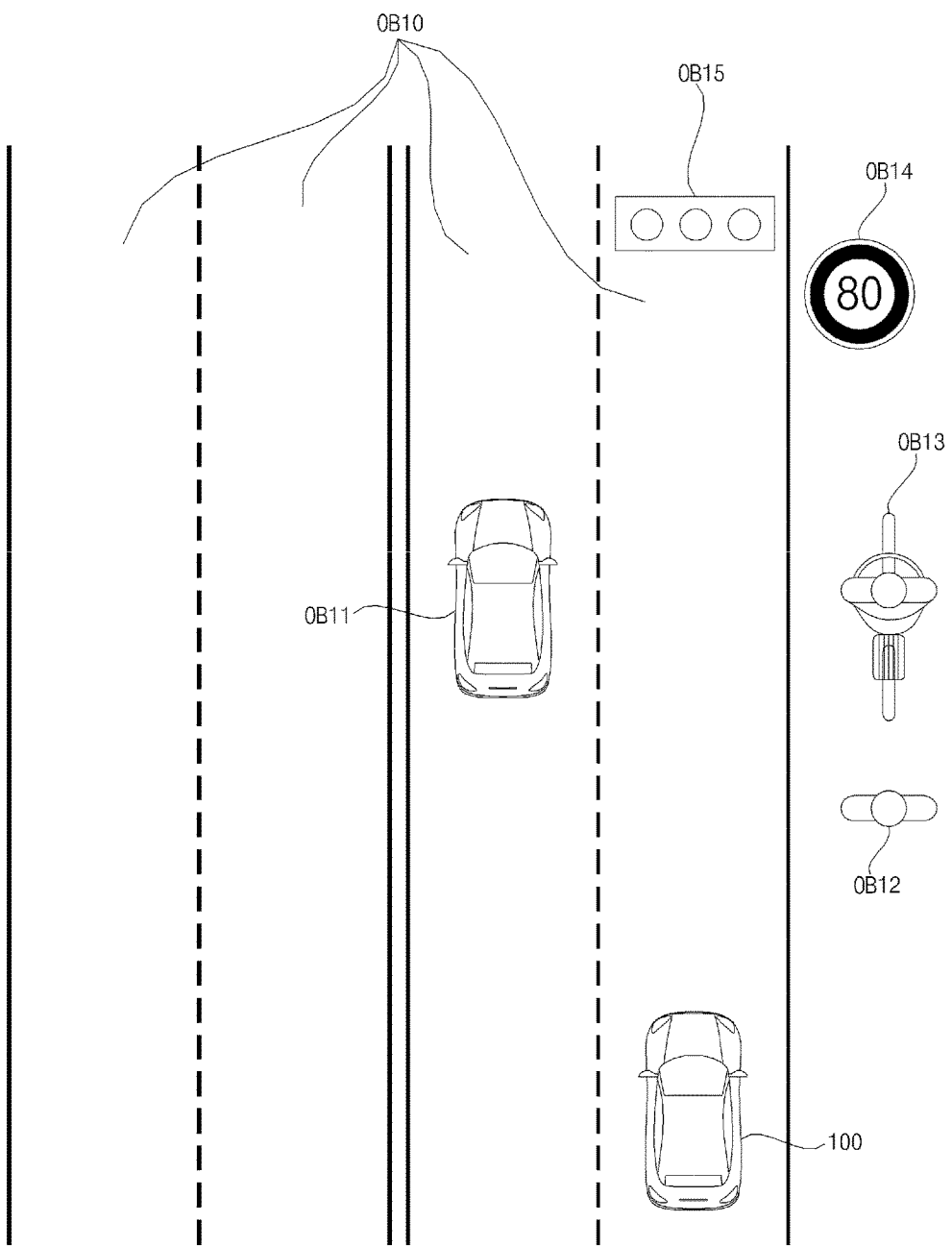
FIGS. 5 and 6 are diagrams for explanation of an object according to an embodiment of the present invention.
Figure 6:
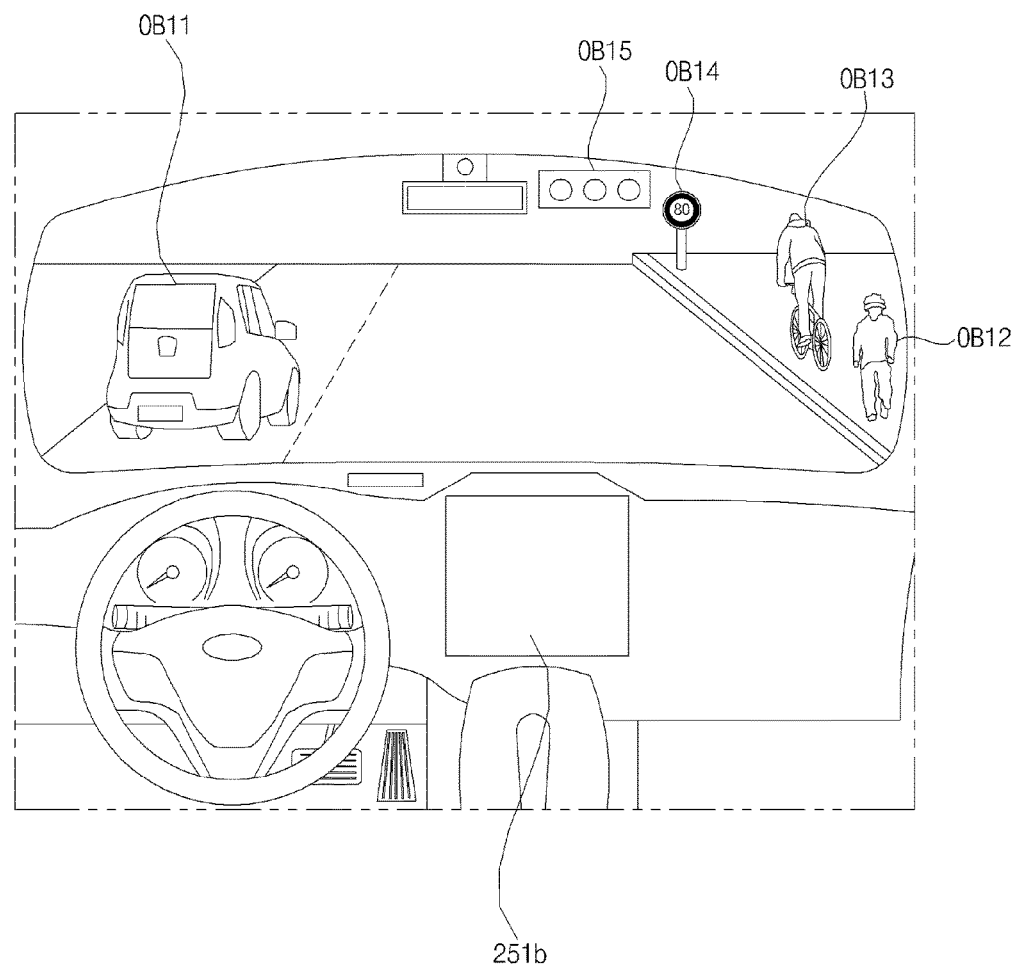

FIGS. 5 and 6 are diagrams for explanation of objects according to an embodiment of the present invention.

Figure 7:
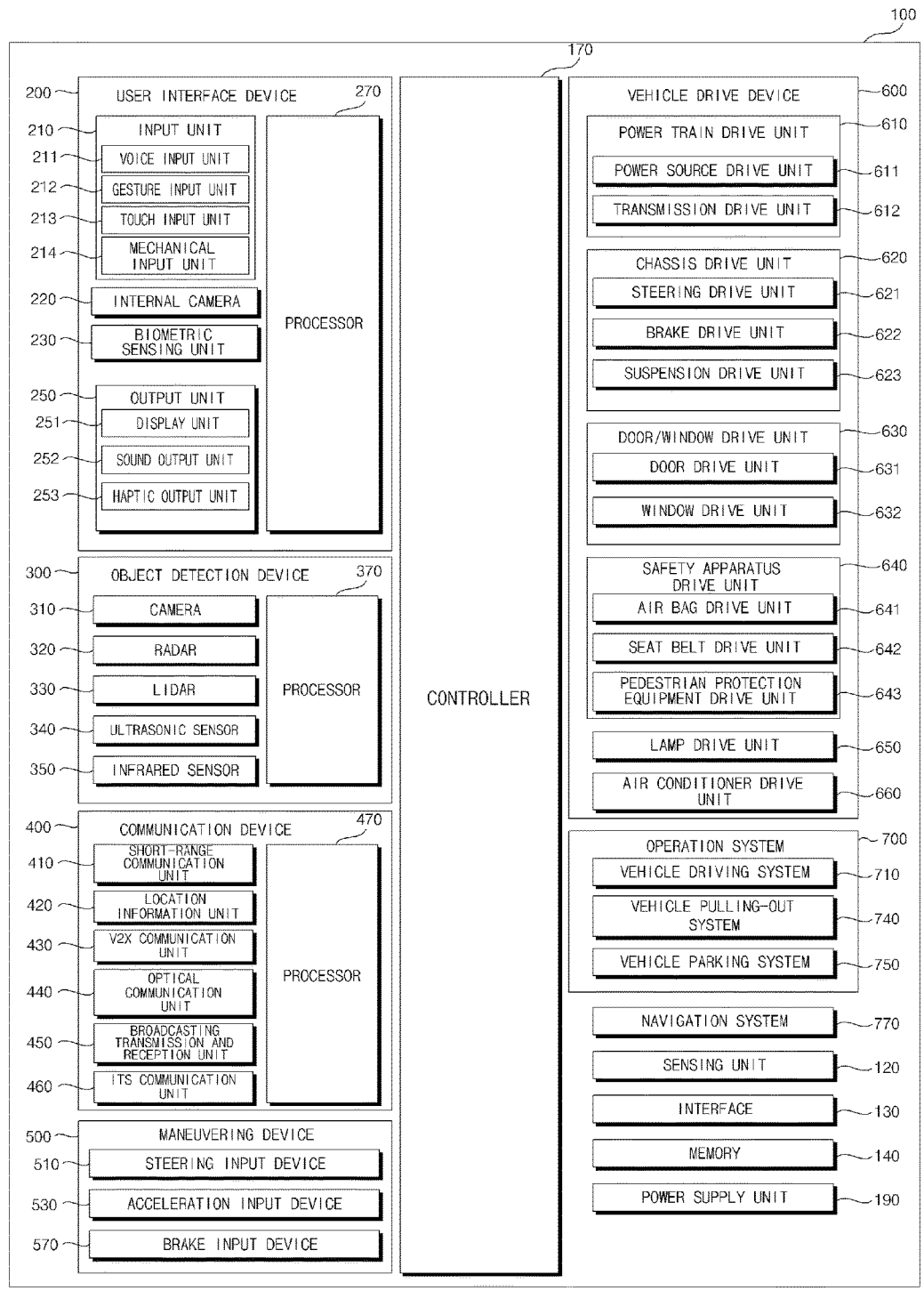
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa.

The vehicle 100 may be switched to the autonomous driving mode or to the manual mode based on driving situation information.

The driving situation information may include at least one of the following: information about an object located outside the vehicle 100, navigation information, and vehicle state information.

For example, the vehicle 100 may be switched from the manual mode to the autonomous driving mode, or vice versa, based on driving situation information generated by the object detection device 300.

In another example, the vehicle 100 may be switched from the manual mode to the autonomous driving mode, or vice versa, based on driving situation information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation device 500. In response to the user input received through the driving manipulation device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection device 300, the communication device 400, the driving manipulation device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some embodiments, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information about an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some embodiments, the user interface apparatus 200 may include a plurality of processors 270 or may not include the processor 270.

In a case where the user interface apparatus 200 does not include the processor 270, the user interface apparatus 200 may operate under control of the controller 170 or a processor of a different device inside the vehicle 100.

Meanwhile, the user interface apparatus 200 may be referred to as a display device for vehicle.

The user interface apparatus 200 may operate under control of the controller 170.

The object detection device 300 is configured to detect an object outside the vehicle 100. The objection detection device 300 may generate information about the object based on sensing data.

The information about the object may include information about the presence of the object, location information of the object, information about a distance between the vehicle 100 and the object, and information about a speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information about a distance to the object, and information about speed relative to the object.

For example, based on change in size over time of an object in acquired images, the camera 310 may acquire information about a distance to the object and information about speed relative to the object.

For example, the camera 310 may acquire the information about a distance to the object and the information about speed relative to the object, by utilizing a pin hole model or profiling a road surface.

For example, the camera 310 may acquire the information about a distance to the object and the information about the speed relative to the object, based on information about disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information about the distance to the object and information about the speed relative to the object based on a variation in size over time of the object in acquired images.

In another example, the processor 370 may acquire information about the distance to the object or information about the speed relative to the object by employing a pin hole model or by profiling a road surface.

In yet another example, the processor 370 may acquire information about the distance to the object and information about the speed relative to the object based on information about disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some embodiments, the object detection device 300 may include a plurality of processors 370 or may not include the processor 370. For example, each of the camera 310, the radar 320, the lidar 330, the ultrasonic sensor 340, and the infrared sensor 350 may include its own processor.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian(V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface apparatus 200. In this case, the vehicle display device may be referred to as a telematics device or an Audio Video Navigation (AVN) device.

The communication device 400 may operate under control of the controller 170.

The driving manipulation device 500 is configured to receive a user input for driving the vehicle 100.

In the manual mode, the vehicle 100 may operate based on a signal provided by the driving manipulation device 500.

The driving manipulation device 500 may include a steering input device 510, an acceleration input device 530, and a brake input device 570.

The steering input device 510 may receive a user input with regard to the direction of travel of the vehicle 100.

The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The driving manipulation device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface apparatus 270, the object detection device 300, the communication device 400, the driving manipulation device 500, the vehicle drive device 600, the navigation system 770, the sensing unit 120, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 based on information about an object received from the object detection device 300.

The driving system 710 may perform driving of the vehicle 100 by providing a control signal to the vehicle drive device 600 in response to reception of a signal from an external device through the communication device 400.

The driving system 710 may be a system which includes at least one of the user interface apparatus 270, the object detection device 300, the communication device 400, the driving manipulation device 500, the vehicle drive device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive device 600 in response to reception of navigation information from the navigation system 770.

The parking-out system 740 may perform an operation of pulling the vehicle 100 out of a parking space, by providing a control signal to the vehicle drive device 600 based on information about an object received from the object detection device 300.

The parking-out system 740 may perform an operation of pulling the vehicle 100 out of a parking space, by providing a control signal to the vehicle drive device 600 based on a signal received from an external device.

The parking-out system 740 may be a system which includes at least one of the user interface apparatus 270, the object detection device 300, the communication device 400, the driving manipulation device 500, the vehicle drive device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive device 600 in response to reception of navigation information from the navigation system 770.

The parking system 750 may perform an operation of parking the vehicle 100 in a parking space, by providing a control signal to the vehicle drive device 600 based on information about an object received from the object detection device 300.

The parking system 750 may perform an operation of parking the vehicle 100 in a parking space, by providing a control signal to the vehicle drive device 600 in response to reception of a signal from an external device.

The parking system 750 may be a system which includes at least one of the user interface apparatus 270, the object detection device 300, the communication device 400, the driving manipulation device 500, the vehicle drive device 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information about a set destination, information about a route to the set destination, information about various objects along the route, lane information, and information about a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
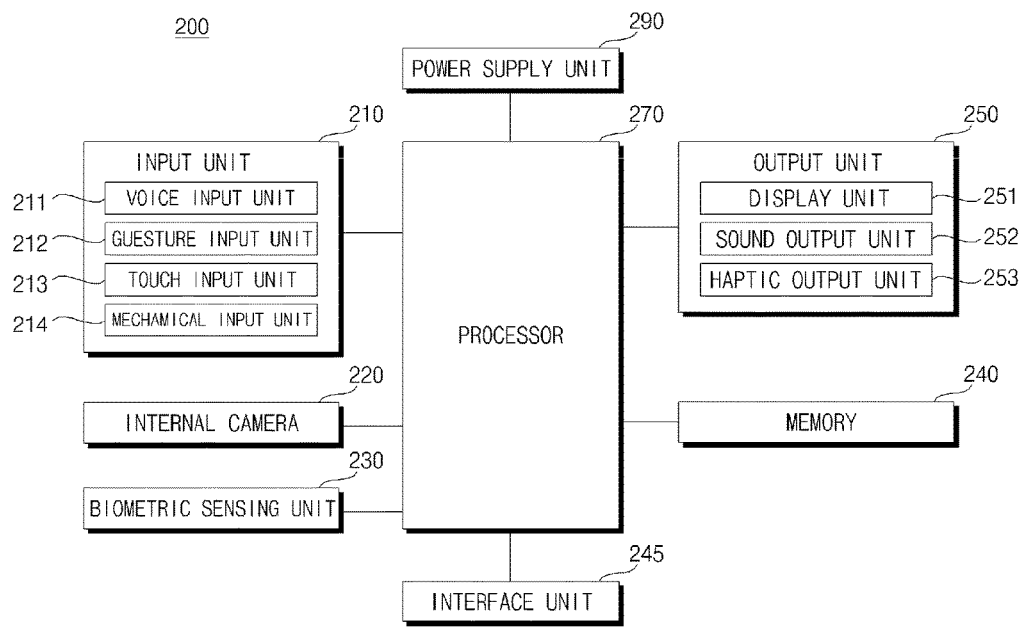
FIG. 8 is a block diagram illustrating a vehicle user interface apparatus according to an embodiment of the present invention.

FIG. 8 is a block diagram illustrating a vehicle user interface according to an embodiment of the present invention.

Referring to FIG. 8, a vehicle user interface 200 may include an input unit 210, an internal camera 220, a biometric sensing unit 230, a memory 240, an interface unit 245, an output unit 250, a processor 270, and a power supply unit 290.

In some embodiments, the user interface apparatus 200 may further include other components to the aforementioned components, or may not include some of the aforementioned components.

The vehicle user interface apparatus 200 shown in FIG. 8 includes the components of the vehicle user interface apparatus 200 shown in FIG. 7. Hereinafter, the same descriptions provided above with reference to FIG. 7 are omitted.

The description provided with reference to FIG. 7 may be applied to the input unit 210, the internal camera 220, and the biometric sensing unit 230.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some embodiments, the memory may be integrated with the processor 270, or may be an element of the processor 270.

The interface unit 245 may exchange information, data, or a signal with a different device included in the vehicle 100. the interface unit 245 may transmit the received information, data, or signal to the processor 270. The interface unit 245 may transmit information, data, or a signal generated or processed by the processor 270 to a different device included in the vehicle 100. The interface unit 245 may receive information, data, or a signal from a different device included in the vehicle 100.

The interface unit 245 may receive a forward-view image from the object detection device 300.

The interface unit 245 may receive driving situation information.

The interface unit 245 may receive information about an object located outside the vehicle 100 from the object detection device 300.

For example, the interface unit 245 may receive information about an object located in front of vehicle 100.

The interface unit 245 may receive navigation information from the navigation system 770.

The interface unit 245 may receive vehicle state information from the sensing unit 120.

For example, the interface unit 245 may receive driving speed information of the vehicle 100 from the sensing unit 120.

The interface unit 245 may receive traffic volume information. The traffic volume information may be generated based on information about a nearby vehicle which is located in the vicinity of the vehicle 100 and detected by the object detection device 300. The traffic volume information may be received from a device outside of the vehicle 100 through the communication device 400.

Information, data, or a signal received by the interface unit 245 may be provided to the processor 270.

The output unit 250 may include a display unit 251, a sound output unit 252, and a haptic output unit 253.

The description as described above with reference to FIG. 7 may be applied to the output unit 250. Hereinafter, the description mainly about the display unit 251 is provided.

The display unit 251 may operate under control of the processor 270.

The display unit 251 may implement a display layer having a predetermined virtual distance.

The display unit 251 may implement multiple display layers. Each of the multiple display layers may have a different virtual distance.

For example, the display unit 251 may implement a first display layer and a second display layer. The first display layer may have a first virtual distance. The second display layer may have a second virtual distance. The second virtual distance may be different from the first virtual distance.

For example, the display unit 251 may further implement a third display layer. The third display layer may have a third virtual distance.

The display unit 251 will be described in more detail with reference to FIGS. 9A to 11.

The processor 270 may control the overall operation of each unit of the user interface apparatus 200.

The processor 270 may receive driving situation information of the vehicle 100 through the interface unit 245.

The processor 270 may control the display unit 251 based on the driving situation information so as to vary a virtual distance of each of the multiple display layers.

The multiple display layers may include a first display layer, a second display layer, and a third display layer.

Meanwhile, a display layer may be defined as one region of a virtual plane on which virtual contents are displayed.

Meanwhile, a virtual distance may be defined as a distance from a user's eye to a display layer on which a virtual image is displayed.

The processor 270 may control the display unit 251 to display contents item on the multiple display layers.

The processor 270 may control the display unit 251 to display a different content item on each of the multiple display layers.

The processor 270 may control the display unit 251 to display a first content item on the first display layer.

The processor 270 may control the display unit 251 to display a second content item on the second display layer. The second content item may be different from the first content item.

The processor 270 may control the display unit 251 to display a third content item on the third display layer. The third content item may be different from the first content item and the second content item.

The processor 270 may control the display unit 251 to display the same content item on the multiple display layers in different time.

The processor 270 may control the display unit 251 to display the first content item on the first display layer for a first period of time.

The processor 270 may control the display unit 251 to display the first content item on the second display layer for a second period of time. The second period of time may be a period of time continuous with the first period of time.

The processor 270 may control the display unit 251 to display the first content item on the third display layer for a third period of time. The third period of time may be a period of time continuous with the second period of time.

The processor 270 may control the display unit 251 to display the first content item on the third display layer for a first period of time.

The processor 270 may control the display unit 251 to display the first content item on the second display layer for a second period of time. The second period of time may be a period of time continuous with the first period of time.

The processor 270 may control the display unit 251 to display the first content item on the first display layer for a third period of time. The third period of time may be a period of time continuous with the second period of time.

The processor 270 may control the display unit 251 to make the first content item and the second content item displayed overlapping each other. The first content item may be displayed on the first display layer. The second content item may be displayed on the second display layer.

The processor 270 may apply a graphic effect to a content item corresponding to information based on an importance level of the information. The graphic effect may include an out-of-focus effect and a fade-in/fade-out effect.

The processor 270 may apply a graphic effect to a content item corresponding to driving situation information based on an importance level of the driving situation information.

Meanwhile, the processor 270 may apply a graphic effect to a content item to vary a virtual distance.

When displaying a first content item on the first display layer while a second content item is displayed on the second display layer, the processor 270 may control the display unit 251 to apply an out-of-focus effect to the second content item.

The driving situation information may include first information and second information. The first information may be information having an importance level which is set higher than that of the second information. For example, the first information may be information related to driving of the vehicle 100. The second information may be information not related to driving of the vehicle 100.

An importance level of driving situation information may be set by the object detection apparatus 300. For example, the object detection device 300 may set an importance level for a pedestrian to be higher than an importance level for information about a nearby vehicle.

The processor 270 may generate a first content item based on the first information. The processor 270 may generate a second content item based on the second information.

When displaying the first content item on the first display layer while a second content item is displayed on the second display layer, the processor 270 may control the display unit 251 to apply a fade-in effect to the first content item.

After displaying the first content item, the processor 270 may control the display unit 251 to apply a fade-out effect to the second content item.

The processor 270 may control the display unit 251 to display the first content item or the second content item at a predetermined angle to a road surface on which traffic lines are formed. The road surface may be defined as a plane on which traffic lines defining a traffic lane are painted.

The processor 270 may control the display unit 251 to change the predetermined angle over time.

The processor 270 may display an augmented-reality content item on a display layer having a relatively long virtual distance, and a non-augmented reality content item on a display layer having a relatively short virtual distance.

The processor 270 may receive a forward-view image through the interface unit 245.

The processor 270 may control the display unit 251 to display a non-augmented reality content item on the first display layer having a first virtual distance. The processor 270 may control the display unit 251 to display an augmented reality content item, which is based on a forward-view image, on the second display layer having a second virtual distance. The second virtual distance may be longer than the first virtual distance.

The processor 270 may receive, through the interface unit 245, information about an object located in front of the vehicle 100.

The processor 270 may control the display unit 251 to vary the first virtual distance or the second virtual distance based on information about a distance between the vehicle 100 and the object.

For example, the processor 270 may control the display unit 251, so that the virtual distance or the second virtual distance reduces as a distance between the vehicle 100 and an object reduces.

The processor 270 may control the display unit 251, so that a first content item displayed on the second display layer moves to the first display layer based on information about a distance between the vehicle 100 and an object.

For example, as a distance between the vehicle 100 and an object reduces, the processor 270 may control the display unit 251, so that a first content item moves from the second display layer to the first display layer.

When the first content is moved from the second display layer to the first display layer, the processor 270 may control the display unit 251 to change at least one of size, shape, transparency, and color of the first content item.

Meanwhile, information about an object may include information about a slope located on the road ahead, information about a curve, and information about a circular intersection.

The processor 270 may control the display unit 251 to vary the first virtual distance or the second virtual distance based on information about a distance between the vehicle 100 and the slope, information about a distance between the vehicle 100 and the curve, or information about a distance between the vehicle 100 and the circular intersection.

The processor 270 may receive traffic volume information through the interface unit 245.

The processor 270 may control the display unit 251 to vary a virtual distance of each of the multiple display layers based on the traffic volume information.

The traffic volume information may be generated based on the number of nearby vehicles present in a reference section including where the vehicle 100 is located.

For example, the processor 270 may control the display unit 251, so that a virtual distance gradually reduces as traffic volume increases.

For example, the processor 270 may control the display unit 251, so that a virtual distance gradually increases as traffic volume reduces.

The processor 270 may receive driving speed information of the vehicle 100 through the interface unit 245.

The processor 270 may control the display unit 251 to vary a virtual distance of each of the multiple display layers based on the driving speed information of the vehicle 100.

For example, the processor 270 may control the display unit 251, so that a virtual distance reduces as a driving speed reduces.

For example, the processor 270 may control the display unit 251, so that a virtual distance increases gradually as a driving speed increases.

The processor 270 may receive location information of the vehicle 100 through the interface unit 245.

The processor 270 may control the display unit 251 to vary a virtual distance of each of the multiple display layers based on the location information of the vehicle 100.

For example, the processor 270 may control the display unit 251, so that a virtual distance reduces when the vehicle 100 is travelling around the downtown area.

For example, the processor 270 may control the display unit 251, so that a virtual distance increases when the vehicle 100 is travelling on the highway.

The processor 270 may control the display unit 251 to vary a virtual distance of each of the multiple display layers based on information about time when the vehicle 100 is travelling.

The information about a time when the vehicle 100 is travelling may be generated based on data stored in the memory 240. Alternatively, the information about a time when the vehicle 100 is travelling may be received from the communication device 400 or the navigation system 770 through the interface unit 245.

For example, when the vehicle 100 is travelling in the nighttime, the processor 270 may control the display unit 251 to reduce a virtual distance.

For example, when the vehicle 100 is travelling in the daytime, the processor 270 may control the display unit 251 to increase a virtual distance.

Under control of the processor 270, the power supply unit 290 may supply power required for operation of each component. In particular, the power supply unit 290 may receive power from a battery provided inside the vehicle 100.

Figure 9A:
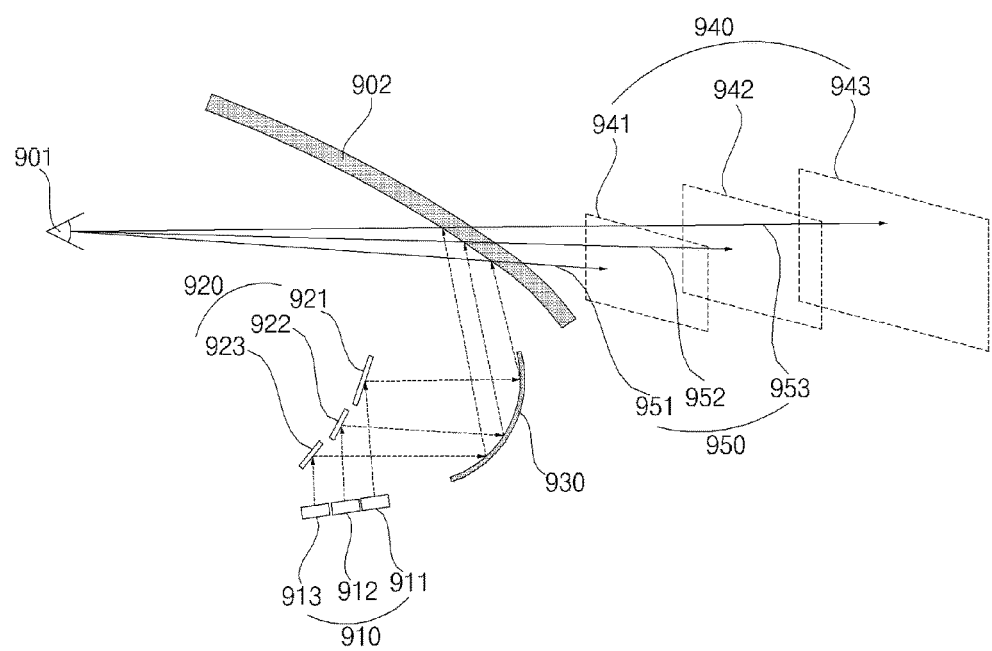
FIG. 9A is a diagram for explanation of configuration of a display unit and multiple display layers according to an embodiment of the present invention.

FIG. 9A is a diagram for explanation of configuration of a display unit and multiple display layers according to an embodiment of the present invention.

Figure 9B:
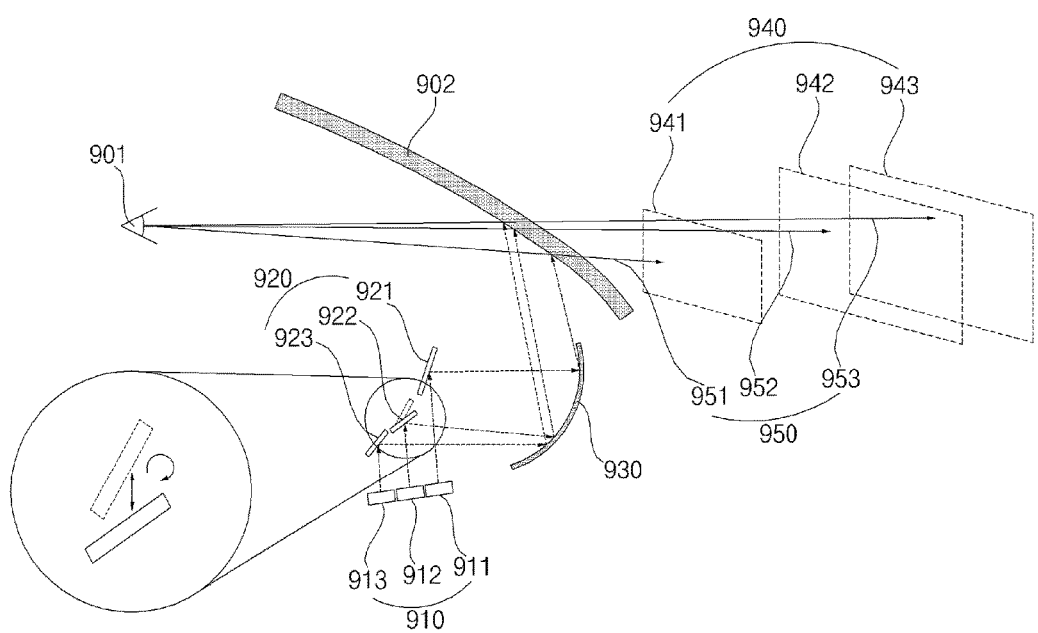
FIG. 9B is a diagram for explanation of an operation of varying multiple layers according to an embodiment of the present invention.

FIG. 9B is a diagram for explanation of an operation of varying multiple layers according to an embodiment of the present invention.

Referring to the drawings, the display unit 251 may include an image processing unit 910, a flat mirror 920, and a concave mirror 930.

The image unit 910 may generate and output an image based on a control signal from the processor 270. The image unit 910 may project the generated image. The image generated by the image unit 910 may be projected onto the flat mirror 920.

The image unit 910 may include a plurality of image output units. The image unit 910 may include a plurality of image output units 911, 912, and 913 to correspond to the number of multiple display layers.

For example, the image unit 910 may include a first image output unit 911, a second image output unit 912, and a third image output unit 913.

In the drawings, an example is shown in which shown that the image unit 910 includes three image output units, but the image unit 910 may include two image output units. In another example, the image unit 910 may include four or more image output units.

The flat mirror 920 may reflect an image, generated and projected by the image unit 910, toward the concave mirror 930.

The flat mirror 920 may include a plurality of mirror 921, 922, and 923. The flat mirror 920 may include a plurality of mirror 921, 922, and 923 to correspond to the number of multiple display layers.

For example, the flat mirror 920 may include a first mirror 921, a second mirror 922, and a third mirror 923.

In the drawings, an example is shown in which the flat mirror 920 includes three mirrors, but the flat mirror 920 may include two mirrors. In another example, the flat mirror 920 may include four or more mirrors.

As illustrated in FIG. 9B, the flat mirror 920 may move to adjust an angle of reflection.

For example, the display unit 251 may further include a flat mirror driving unit. The flat mirror driving unit may include a motor, an actuator, or a solenoid.

The flat mirror driving unit may adjust the position of the flat mirror 920 based on a control signal from the processor 270.

A virtual distance may be varied based on adjustment of the position of the flat mirror 920. Specifically, as the position of the flat mirror 920 is adjusted, a location of a virtual image projected onto a windshield 902 may be changed. As the location of the virtual image projected onto the windshield 902 is changed, a virtual distance 950 of a display layer may be changed.

In the drawings, an example is shown in which the position of the second mirror 922 is adjusted, but even the position of the first mirror 921 and the position of the third mirror 923 may be adjusted.

The concave mirror 930 may reflect an image, reflected from the flat mirror 920, toward the windshield 902. In this case, the image reflected from the concave mirror 930 may be projected onto the windshield 902. The image projected onto the windshield 902 is a virtual image. In some embodiments, the image reflected from the concave mirror 930 may be projected onto a combiner.

A user 901 may recognize an image projected onto the windshield 902 as being located before the windshield 902.

A virtual image may be formed in one region of a virtual plane located before the windshield 902. A display layer 940 may be defined as one region of the virtual plane on which the virtual image is formed. In this case, a virtual distance 950 may be defined as a distance from the user's eye 901 to the display layer 940.

The virtual distance 950 may be varied based on adjustment of position of the flat mirror 920. For example, when the virtual distance 950 has a first value based on first position of the flat mirror 920, the processor 270 may control the flat mirror driving unit to adjust the position of the flat mirror to a second position. In this case, a virtual distance 920 may have a second value.

The display layer 940 may be multiple display layers 940.

The multiple display layers 940 may include a first display layer 941, a second display layer 942, and a third display layer 943.

An image generated by the first image output unit 911 is reflected from the first mirror 921, reflected again from the concave mirror 930, and in turn projected onto the windshield 902. The image projected onto the wind shield 902 may be implemented as a virtual image formed on the first display layer. In this case, the first display layer 941 may have a first virtual distance 951.

An image generated by the second image output unit 912 is reflected from the second mirror 922, reflected again from the concave mirror 930, and in turn projected onto the windshield 902. The image projected onto the windshield 902 may be implemented as a virtual image formed on the second display layer 942. In this case, the second display layer 942 may have a second virtual distance 952.

An image generated by the third image output unit 913 is reflected from the third mirror 923, reflected again from the concave mirror 930, and in turn projected onto the windshield 902. The image projected onto the windshield 902 may be implemented as a virtual image formed on the third display layer 943. In this case, the third display layer 943 may have a third virtual distance 953.

Figure 10:
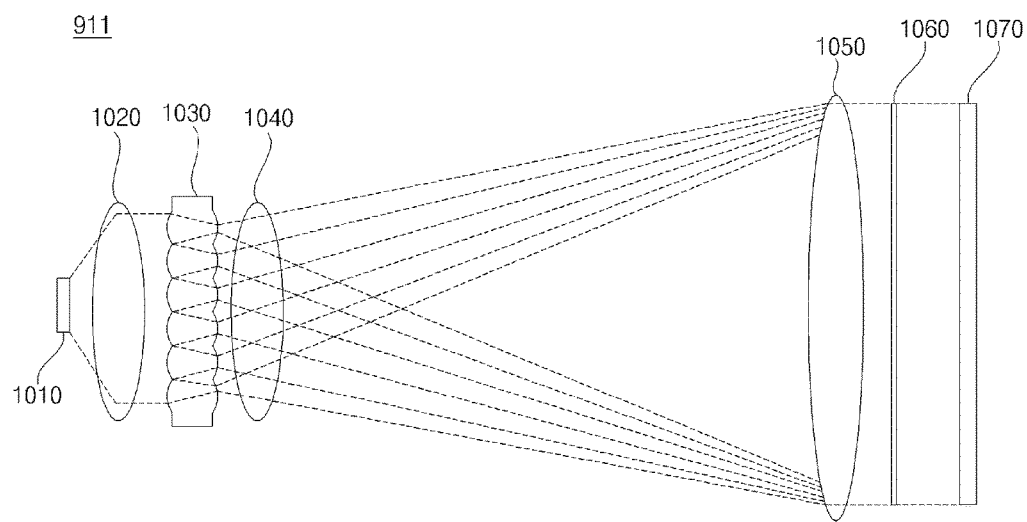
FIG. 10 is diagram for explanation of an image output unit according to an embodiment of the present invention.

FIG. 10 is diagram for explanation of an image output unit according to an embodiment of the present invention.

Referring to FIG. 10, description about the first image output unit 911 will be provided. It is understood that the second image output unit 912 and the third image output unit 913 have the same configuration as that of the first image output unit 911 described with reference to FIG. 10.

The first image output unit 911 may include a backlight unit 1010, a collimation lens 1020, an illumination lens 1040 and 1050, a Fly Eye Lens (FEL) 1030, an imaging panel 1060, and a variable focal lens 1070.

The backlight unit 1010 may include one or more light source. For example, the backlight unit 1010 may include one or more Light Emitting Diodes (LEDs).

The backlight unit 1010 may output white light.

The collimation lens 1020 may be disposed between the backlight unit 1010 and the FEL 1030.

The collimation lens 1020 may cause lights output from the backlight unit to travel in parallel. The lights passing through the collimation lens 1020 may be irregularly distributed.

The illumination lens 1040 and 1050 may focus the lights passing through the FEL 1030 onto the imaging panel 1050.

The illumination lens 1040 and 1050 may include a first illumination lens 1040 and a second illumination lens 1050.

The first illumination lens 1040 may focus lights, which are distributed after passing through the FEL 1030, onto the second illumination lens 1050.

The second illumination lens 1050 may focus lights, which pass through the first illumination lens 1040 and are incident at different angles, onto the imaging panel 1060.

The FEL 1030 may convert irregularly distributed lights into regularly distributed lights.

The FEL 1030 may include a plurality of cells. The FEL 1030 may expand lights, which are to be provided to at least some of the cells of the FEL 1030, to a predetermined size, so that uniform lights may be provided to the imaging panel 1060.

The FEL 1030 may be disposed between the collimation lens 1020 and the imaging panel 1060.

The imaging panel 1060 may form an image based on lights provided from the backlight unit. For example, the imaging panel 1060 may include a Liquid Crystal Display (LCD).

The variable focal lens 1070 may vary a focal distance based on a control signal from the processor 270.

The variable focal lens 1070 may include liquid crystals. The variable focal lens 1070 may change a location at which a virtual image is to be formed based on a generated image, according to arrangement of the liquid crystals.

The processor 270 may control the variable focal lens 1070 to vary the virtual distance 950 of the display payer 940.

Figure 11:
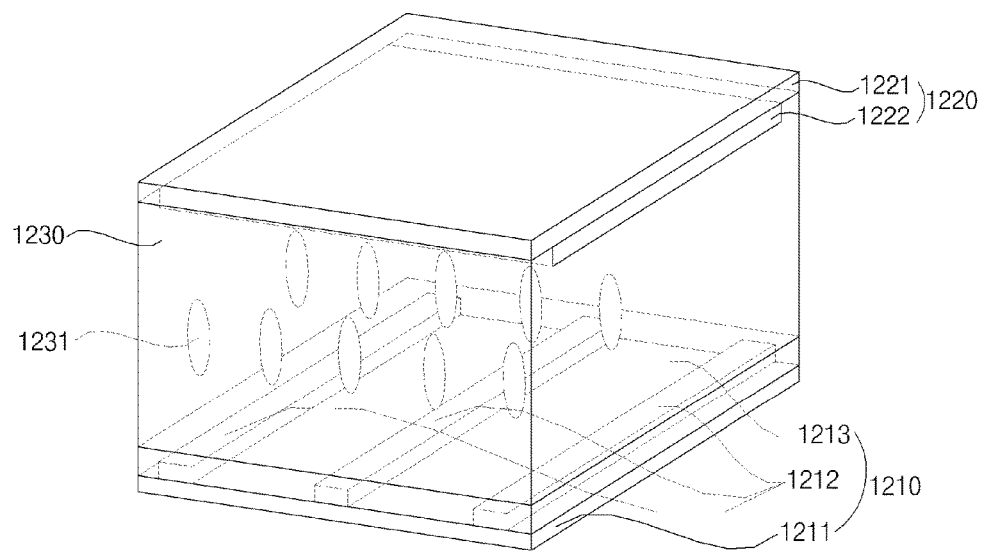
FIG. 11 is a diagram for explanation of a variable focal lens according to an embodiment of the present invention.

FIG. 11 is a diagram for explanation of a variable focal lens according to an embodiment of the present invention.

The variable focal lens 1070 may include a first substrate 1210, a second substrate 1220, and a liquid crystal layer 1230.

The first substrate 1210 may include a first base substrate 1211, a plurality of first electrodes 1212, and an insulating layer 1213.

The plurality of first electrodes 1212 may be formed on the first base substrate 1211. The plurality of first electrodes 1212 are spaced apart a predetermined distance. Under control of the processor 270, a voltage may be applied to the plurality of first electrodes 1212. For example, under control of the processor 270, a voltage at a different level may be applied to each of the first electrodes 1212.

Meanwhile, the plurality of first electrodes 1212 may be transparent electrodes. For example, the plurality of first electrodes 1212 may be Indium Tin Oxide (ITO) transparent electrodes. As the first electrodes 1212 are formed as transparent electrodes, they may not block vision.

The insulating layer 1213 may be formed on the first base substrate 1211 to cover the plurality of first electrodes 1212.

The second substrate 1220 may be disposed to face the first substrate 1210. The second substrate 1220 may include a second base substrate 1221 and a second electrode 1222.

The second electrode 1222 may be formed on the second base substrate 1221. The second electrode 1222 may be disposed to face the plurality of first electrodes 1212. Under control of the processor, a voltage may be applied to the second electrode 1222. Under control of the processor 270, a voltage at a constant level may be applied to the second electrode 1222.

Meanwhile, the second electrode 1222 may be a transparent electrode. For example, the second electrode 1222 may be an ITO transparent electrode. As the second electrode 1222 is formed as a transparent electrode, it may not block vision.

The liquid crystal layer 1230 may be disposed between the first substrate 1210 and the second substrate 1220. The liquid crystal layer 1231 may include a plurality of liquid crystal molecules 1231. The plurality of liquid crystal molecules 1231 may be driven so as to form a predetermined angle from a horizontal direction toward a vertical direction according to amplitude of a provided voltage. As the plurality of liquid crystal molecules 1231 have the predetermined angle in accordance with control of the processor 270, a focal point of the variable focal lens 1070 may be changed.

The variable focal lens 1070 may further include a first transparent plate and a second transparent plate. The first transparent plate may be disposed external to the first substrate 1210. The second transparent plate may be disposed external to the second substrate 1220. A transparent plate may refer to glass.

Figure 12:
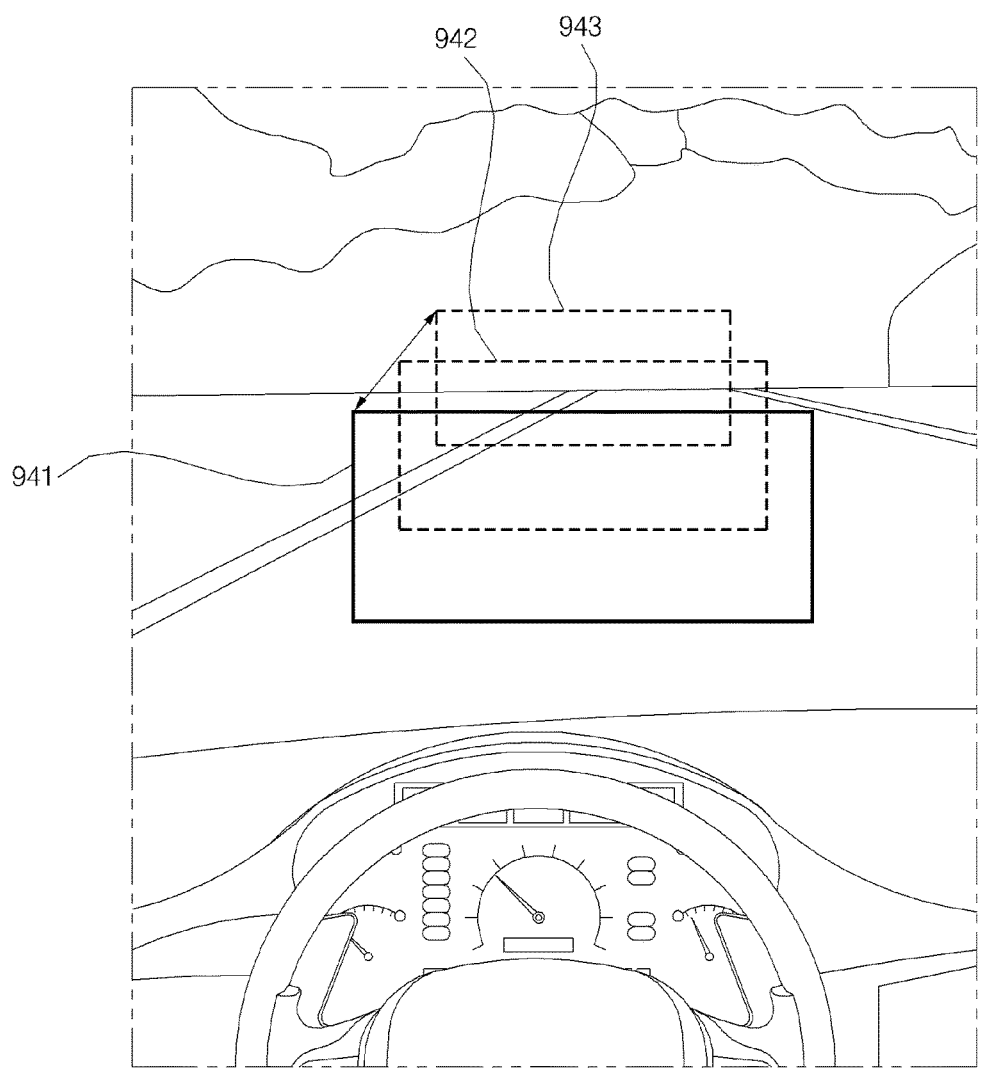
FIG. 12 is a diagram for explanation of a user interface apparatus for a vehicle, as seen in a forward direction from a driver's seat, according to an embodiment of the present invention.

FIG. 12 is a diagram for explanation of a user interface apparatus for a vehicle, as seen in a forward direction from a driver's seat, according to an embodiment of the present invention.

Referring to FIG. 12, the display unit 251 may implement multiple display layers 941, 942, and 943.

The display unit 251 may implement a first display layer 941, a second display layer 942, and a third display layer 943.

The first display layer 941 may have a first virtual distance.

The second display layer 942 may have a second virtual distance. The second virtual distance may be longer than a third virtual distance.

The third display layer 943 may have a third virtual distance. The third virtual distance may be longer than the second virtual distance.

The processor 270 may adjust a virtual distance of each of the multiple display layers 941, 942, and 943 based on driving situation information.

The processor 270 may display contents on the multiple display layers 941, 942, and 943.

Contents may be based on driving situation information. In another example, contents may be based on data stored in the memory 240. In yet another example, contents may be based on data that is received from an external device through the communication device and the interface unit 245.

The processor 270 may control the display unit 251 to display a different content item on each of the multiple display layers 941, 942, and 943.

The processor 270 may control the display unit 251 to display a first content item on the first display layer 941.

The processor 270 may control the display unit 251 to display a second content item on the second display layer 942.

The processor 270 may control the display unit 251 to display a third content item on the third display layer 943.

The processor 270 may control the display unit 251 to make two or more of the first to third content items displayed overlapping each other.

Meanwhile, each of the multiple display layers 941, 942, and 943 may include a variable range of a virtual distance.

For example, the first display layer 941 may have a virtual distance of between a first distance value and a second distance value.

For example the second display layer 942 may have a virtual distance of between the second distance value and a third distance value.

For example, the third display layer 943 may have a virtual distance of between the third distance value and a fourth distance value.

The processor 270 may control the display unit 251, so that the same content item is displayed on each of the multiple display layers 941, 942, and 942 at intervals.

The processor 270 may control the display unit 251 to display a first content item on the third display layer 941 for a first period of time. In this case, the processor 270 may perform a control action so as to change a virtual distance of the third display layer 943 on which the first content item is displayed.

The processor 270 may control the display unit 251 to display a first content item on the second display layer for a second period of time. The second period of time may be a period of time continuous with the first period of time. In this case, the processor 270 may perform a control action to change a virtual distance of the second display layer 942 on which the first content item is displayed.

The processor 270 may control the display unit 251 to display the first content item on the first display layer 941 for a third period of time. The third period of time may be a period of time continuous with the second period of time. In this case, the processor 270 may perform a control action to change a virtual distance of the first display layer 941 on which the first content item is displayed.

By doing so, it is possible to cause the first content item to move gradually close to a user within the range of between the first distance value and the fourth distance value over the first period of time to the third period of time.

Figure 13A:
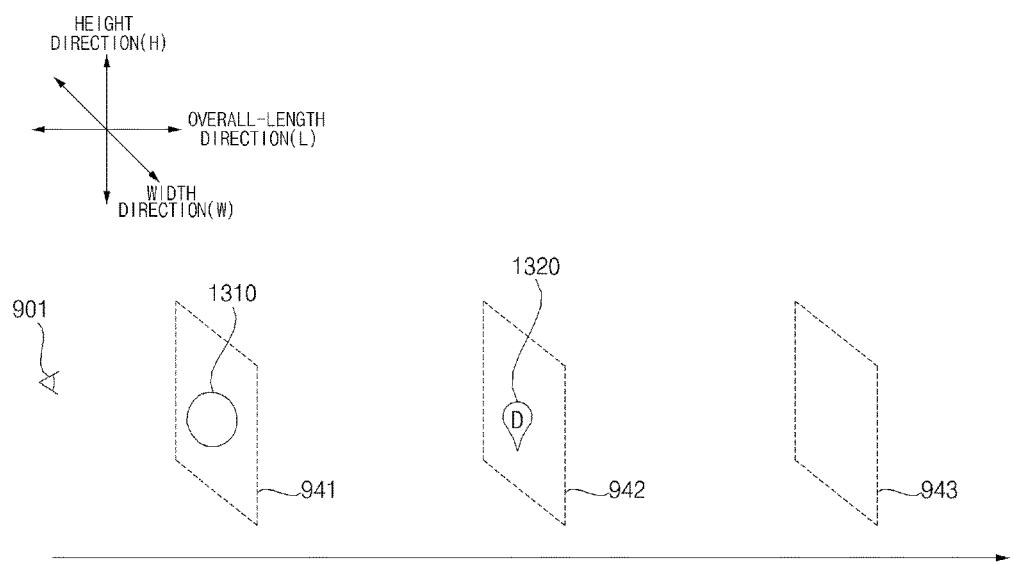
FIGS. 13A and 13B are diagrams for explanation of an operation of applying an out-of-focus effect according to an embodiment of the present invention.
Figure 13B:
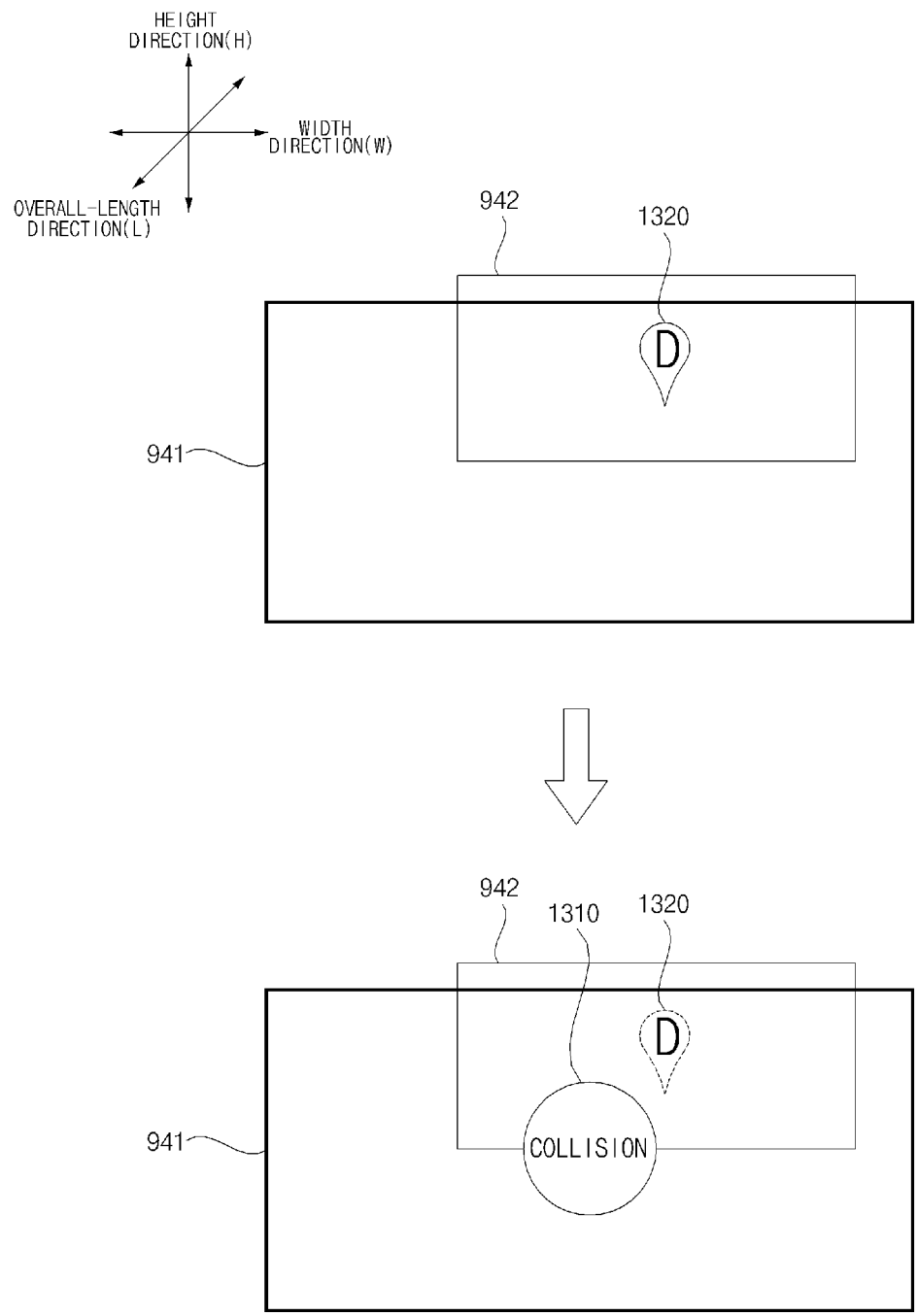

FIGS. 13A and 13B are diagrams for explanation of an operation of applying an out-of-focus effect according to an embodiment of the present invention.

With reference to the drawings, the processor 270 may display a second content item 1320 on the second display layer 942. The second content item 1320 may be a content item based on second information. The second information may be included in driving situation information.

When the second content item 1320 is displayed on the second display layer 942, the processor 270 may display a first content item 1310 on the first display layer 841. The first content item 1310 may be a content item based on first information. The first information may be included in driving situation information.

In this case, the processor 270 may control the display unit 251 to apply an out-of-focus to the second content item. For example, the processor 270 may control the display unit 251 to make the second content item unclear. For example, the processor 270 may control the display unit 251 to reduce visibility of the second content item. For example, the processor 270 may control the display unit 251 to increase transparency of the second content item.

Meanwhile, the first information may be information having an importance level set higher than the second information. The processor 270 may set the importance level of the first information to be higher than that of the second information.

The first information may be emergency situation information. For example, the first information may include information about occurrence of a forward accident. For example, the first information may include information about a possibility of collision between the vehicle 100 and an object.

The processor 270 may set an importance level for information that is the basis of a content item.

For example, the processor 270 may set an importance level for driving situation information to be higher than that of entertainment information.

For example, the processor 270 may set an importance level of information about an accident related to the vehicle 100 to be higher than that of road information.

For example, the processor 270 may set an importance level of information about a pedestrian to be higher than that of information about a nearby vehicle.

If a situation related to the first information is addressed, the processor 270 may control the display unit 251 to make the first content item disappear.

In this case, the processor 270 may display the second content item clearly again.

In this manner, it is possible to provide emergency situation information to a driver in a highly distinguishable manner.

Figure 14A:
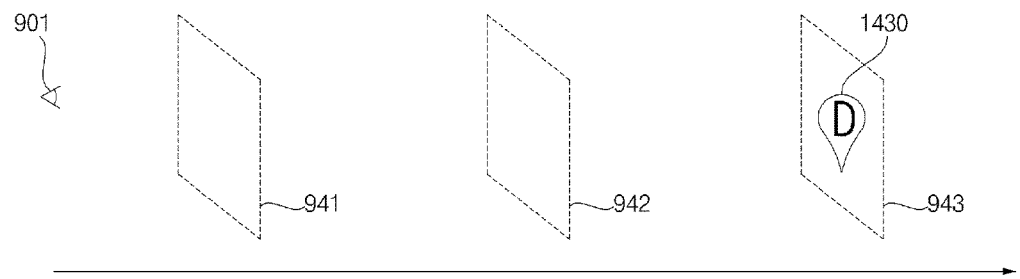
Figure 14A:
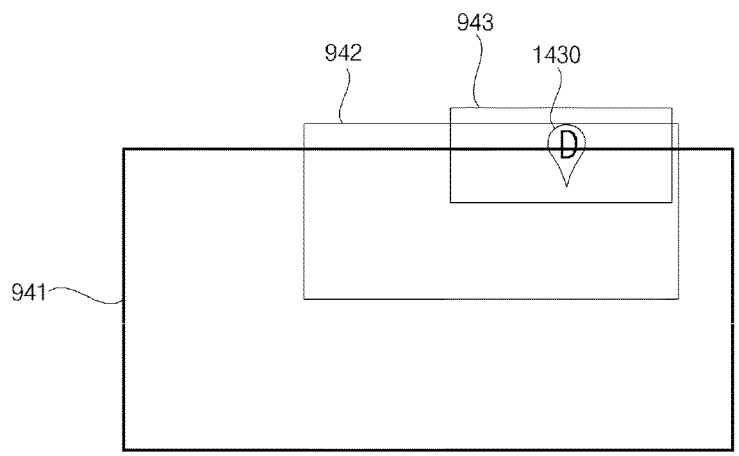
Figure 14B:
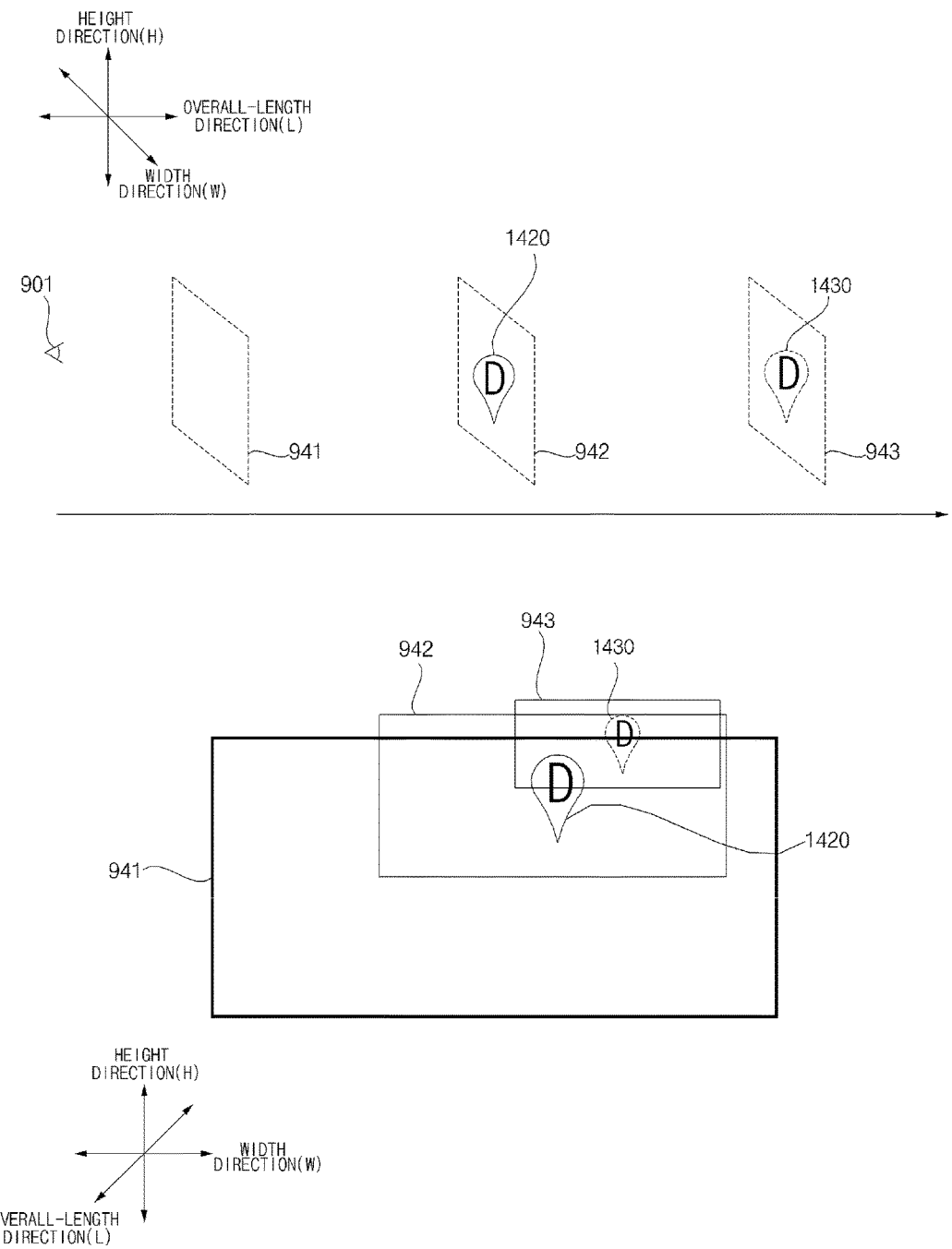

FIGS. 14A to 14C are diagrams for explanation of a fade-in/fade-out effect according to an embodiment of the present invention.

The processor 270 may control the display unit 251 to apply a fade-in/fade-out effect to contents displayed on the display layers 941, 942, and 943.

When displaying a first content item on any one of the multiple display layers 941, 942, and 943, the processor 270 may control the display unit 251 to apply a fade-in effect to the first content item. Specifically, the processor 270 may control the display unit 251 to make the first content item gradually become clear over time.

When making a first content item, displayed on any one of the multiple display layers 941, 942, and 943, disappear, the processor 270 may control the display unit 251 to apply a fade-out effect to the first content item. Specifically, the processor 270 may control the display unit 251, so that the first content item gradually becomes blurred over time and then disappear. In another example, the processor 270 may control the display unit 251, so that the first content item disappears while leaving an afterimage.

As illustrated in FIG. 14A, the processor 270 may control the display unit 251 to display a third content item 1430 on the third display layer 943.

When the third content item 1430 is displayed on the third display layer 943, as illustrated in FIG. 14B, the processor 270 may control the display unit 251 to display a second content item 1420 on the second display layer 942. In this case, the processor 270 may control the display unit 251 to apply a fade-in effect to the second content item 1420 so as to make the second content item 1420 appear. In this case, the processor 270 may control the display unit 251 to apply a fade-out effect to the third content item 1430 so as to make the third content item 1430 disappear.

When the second content item 1420 is displayed on the second display layer 942, as illustrated in FIG. 14C, the processor 270 may control the display unit 251 to display a first content item 1410 on the first display layer 941. In this case, the processor 270 may control the display unit 251 to apply a fade-in effect to the first content item 1410 so as to make the first content item 1410 appear. In this case, the processor 270 may control the display unit 251 to apply a fade-out effect to the second content item 1420 so as to make the second content item 1420 disappear.

The processor 270 may control the display unit 251 to display the first content item on the third display layer 943.

Next, the processor 270 may control the display unit 251 to display the first content item on the second display layer 942. In this case, the processor 270 may control the display unit 251 to apply a fade-in effect to the first content item, which is to be displayed on the second display layer 942, so as to make the first content item appear. In this case, the processor 270 may control the display unit 251 to apply a fade-out effect to the first content item displayed on the third display layer 943 so as to make the first content item disappear.

Next, the processor 270 may control the display unit 251 to display the first content item on the first display layer 941. In this case, the processor 270 may control the display unit 251 to apply a fade-in effect to the first content item, which is to be displayed on the first display layer 941, so as to make the first content item appear. In this case, the processor 270 may control the display unit 251 to apply a fade-out effect to the first content item displayed on the second display layer 942 to make the first content item disappear.

Figure 15:
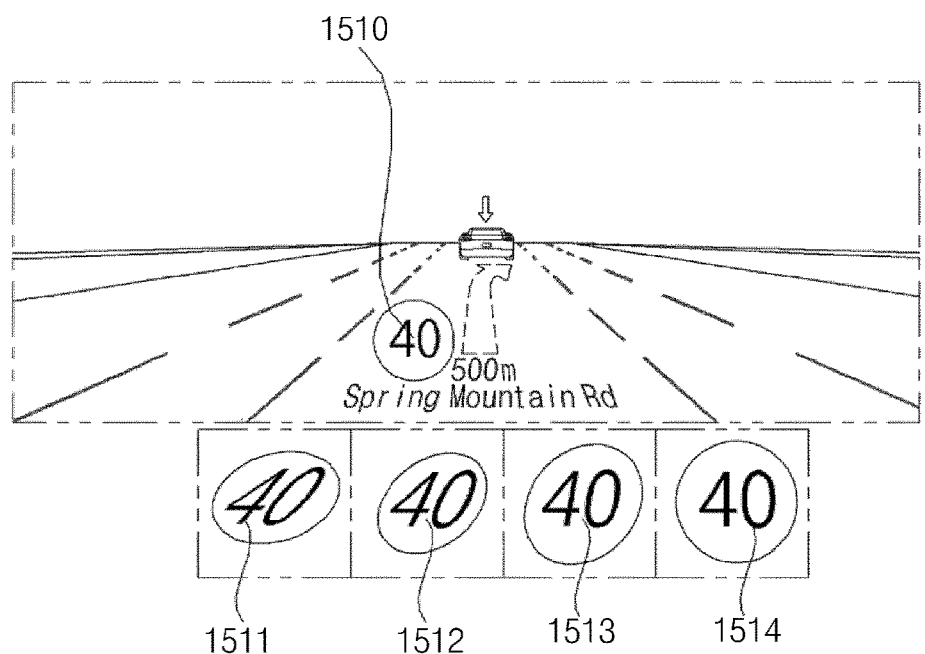
FIG. 15 is a diagram for explanation of an operation of displaying contents according to an embodiment of the present invention.

FIG. 15 is a diagram for explanation of an operation of displaying contents according to an embodiment of the present invention.

Referring to FIG. 15, the processor 270 may display a content item 1510 on any one of the multiple display layers 941, 942, and 943.

The processor 270 may control the display unit 251 to display the content item 1510 at a predetermined angle relative to the road surface.

The processor 270 may control the display unit 251 to change the predetermined angle over time.

For example, the processor 270 may control the display unit 251, so that the angle of the content 1510 relative to the road surface gradually reduces over time. As the vehicle 100 keeps travelling, an importance level of information which is the basis of the content item 1510 may reduce gradually. In this case, by controlling the angle to reduce gradually, it is possible to cause a recognition rate of the content item 1510 to reduce gradually.

For example, the processor 270 may control the display unit 251 to increase an angle of the content item 1510 relative to the road surface over time. As the vehicle 100 keeps travelling, an importance level of information which is the basis of the content item 1510 may gradually increase. In this case, by controlling the angle to increase gradually, it is possible to increase a recognition rate of the content item 1510 to increase gradually.

The processor 270 may control the display unit 251 to change the predetermined angle based on driving speed information.

For example, the processor 270 may control the display unit 251, so that the lower the driving speed, the smaller the angle of the content item 1510 relative to the road surface. As the driving speed reduces more, it may become less necessary to recognize the content item 1510. In this case, by controlling the angle to be smaller, it is possible to reduce the transfer rate of information unnecessary for a driver.

For example, the processor 270 may control the display unit 251, so that the higher the driving speed, the greater the angle of the content item 1510 relative to the road surface. As the driving speed increases more, it may be more necessary to recognize the content 1510. In this case, by controlling the angle to become greater, it is possible to increase the transfer rate of information necessary for a driver.

Figure 16:
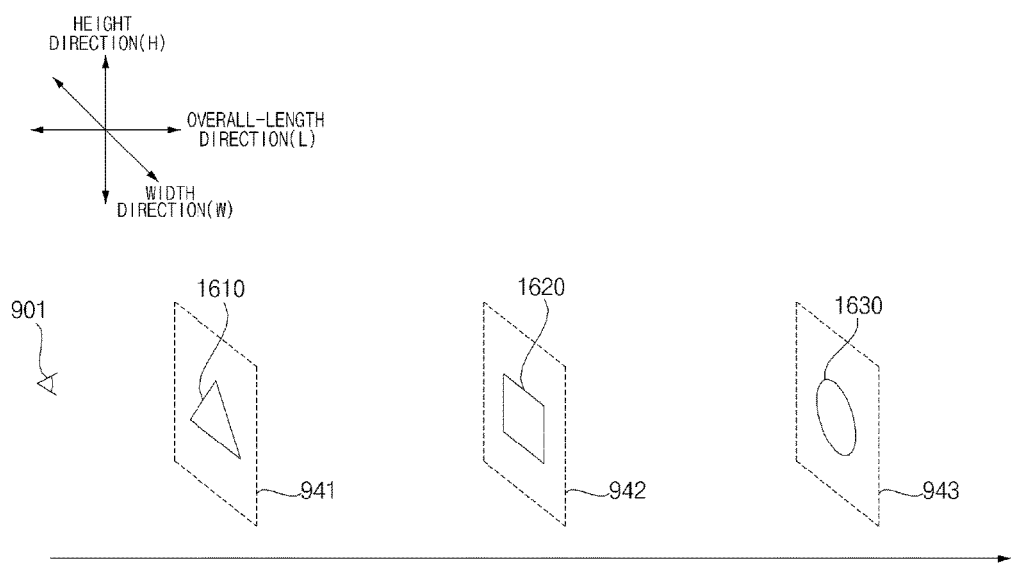
FIG. 16 is a diagram for explanation of an operation of displaying contents according to an embodiment of the present invention.

FIG. 16 is a diagram for explanation of an operation of displaying contents according to an embodiment of the present invention.

Referring to FIG. 16, the processor 270 may receive a forward-view image through the interface unit 245.

The processor 270 may display a first content item on the first display layer 941. The first content item 1610 may be a non-augmented reality content item. For example, the first content item 1610 may be a TBT image and a speed limit image.

The processor 270 may display a second content item 1620 on the second display layer 942. The second content item 1620 may be an augmented reality content item. For example, the second content item 1620 may be an image indicating a close Point of Interest (POI), and an image indicating information about a close object.

The processor 270 may display a third content item 1630 on the third display layer 943. The third content item 1630 may be an augmented reality content item. For example, the third content item 1630 may include an image indicating a distant POI, and an image indicating a distant object.

The processor 270 may display an object information-based content item in augmented reality.

If a distance between the vehicle 100 and an object is changed, the processor 270 may adjust a virtual distance of a display layer, on which a content item is displayed, based on the changed distance.

In this manner, augmented reality content may match well with a real subject, and therefore, a user may feel the content more realistic.

Figure 17:
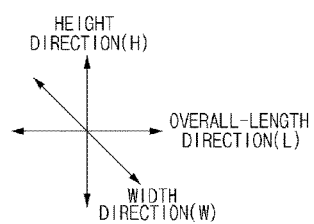
FIG. 17 is a diagram for explanation of an operation of adjusting a virtual distance according to an embodiment of the present invention.
Figure 17:
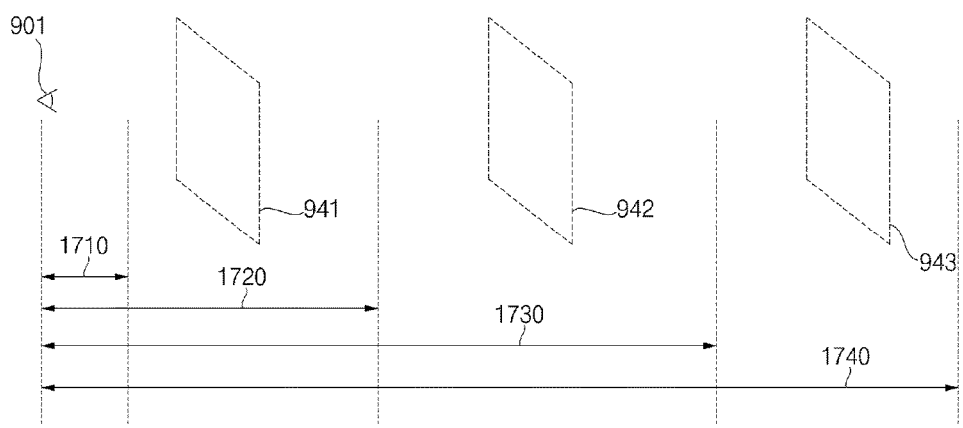

FIG. 17 is a diagram for explanation of an operation of adjusting a virtual distance according to an embodiment of the present invention.

Referring to FIG. 17, the processor 270 may adjust a virtual distance of the multiple display layers 941, 942, and 943.

The processor 270 may adjust a virtual distance by controlling the position of a flat mirror 920 (see FIG. 9A).

The processor 270 may adjust a virtual distance by controlling the variable focal lens 1070.

The processor 270 may adjust a virtual distance of the first display layer 941 to a first distance value.

The processor 270 may adjust a virtual distance of the first display layer 941 to a second distance value 1720.

The processor 270 may adjust a virtual distance of the first display layer 941 to a value between the first distance value 1710 and the second distance value 1720.

The processor 270 may adjust a virtual distance of the second display layer 942 to the second distance value 1720.

The processor 270 may adjust a virtual distance of the second display layer 942 to a third distance value 1730.

The processor 270 may adjust a virtual distance of the second display layer 942 to a value between the second distance value 1720 and the third distance value 1730.

The processor 270 may adjust a virtual distance of the third display layer 943 to the third distance value 1730.

The processor 270 may adjust a virtual distance of the third display layer 943 to a fourth distance value 1740.

The processor 270 may adjust a virtual distance of the third display layer 943 to a value between the third distance value 1730 and the fourth distance value 1740.

FIGS. 18A to 18D are diagrams for explanation of an operation of adjusting a virtual distance based on information about an object, according to an embodiment of the present invention.

The processor 270 may adjust a virtual distance based on driving situation information.

The processor 270 may adjust a virtual distance based on information about an object 1810.

The processor 270 may control the display unit 251 to vary a virtual distance based on information about a distance between the vehicle 100 and an object 1810 located in front of the vehicle 100.

A content item 1820 displayed on the multiple display layers 941, 942, and 943 may be based on information about the object 1810. For example, the content item 1820 may be an POI indicative image that indicates the object 1810.

As the vehicle 100 travels forward, a distance between the vehicle 100 and the object 1810 reduces gradually. In this case, the content item 1820 needs to be displayed to gradually move close to the vehicle 100.

Figure 18A:
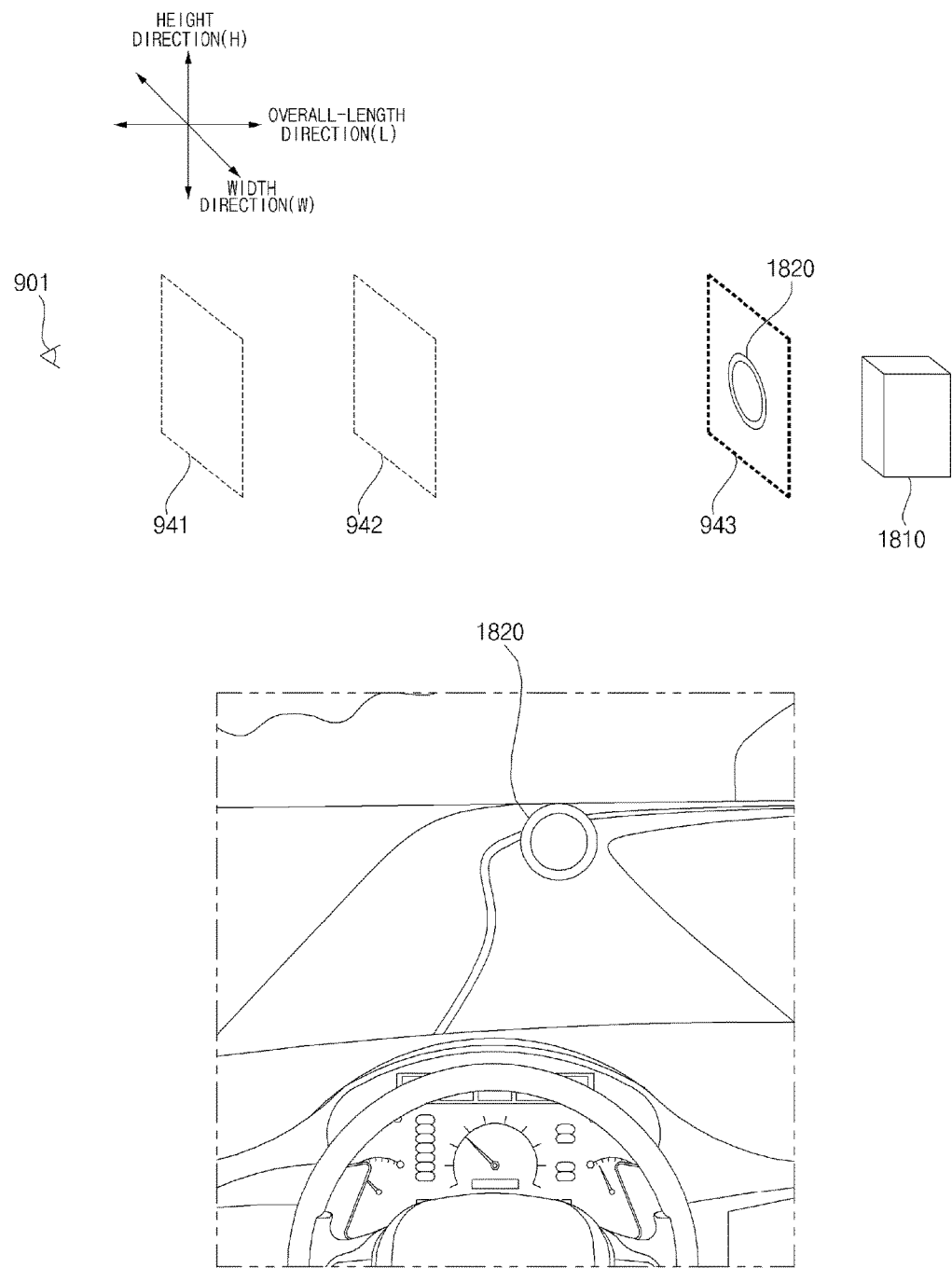
FIGS. 18A to 18D are diagrams for explanation of an operation of adjusting a virtual distance based on information about an object, according to an embodiment of the present invention.

As illustrated in FIG. 18A, if a distance between the vehicle 100 and the object 1810 corresponds to a third distance range, the processor 270 may control the display unit 251 to display the content item 1820 on the third display layer 943. The content item 1820 may be a content item based on the information about the object 1810.

As the distance between the vehicle 100 and the object 1810 reduces gradually within the third distance range, the processor 270 may adjust a virtual distance of the third display layer 943 so that the virtual distance reduces gradually.

As the virtual distance of the third display layer 943 reduces gradually, a user 901 may feel that the content item 1820 gradually moves toward the vehicle 100 or the user 901.

Figure 18B:
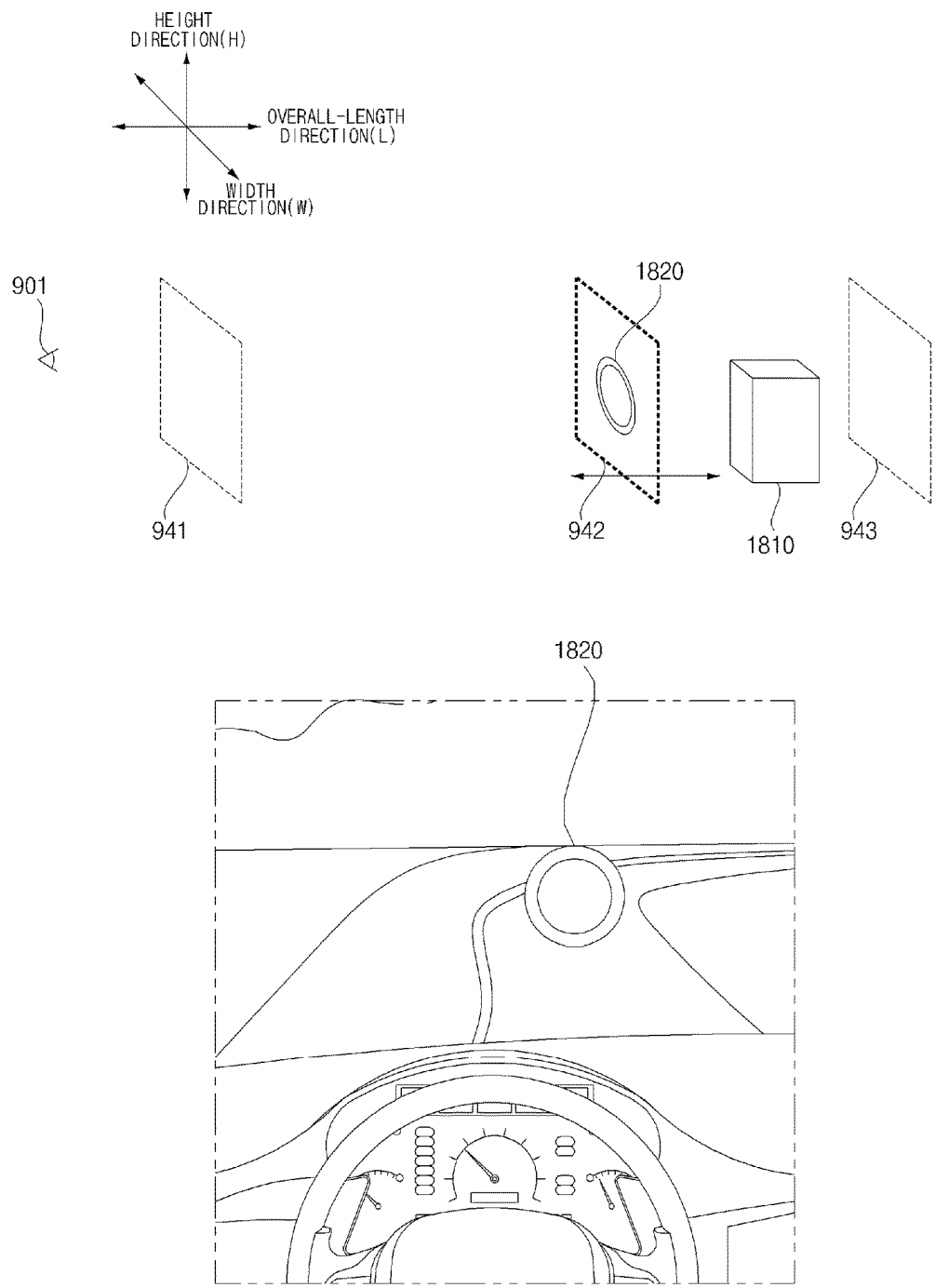

Next, as illustrated in FIG. 18B, if the distance between the vehicle 100 and the object 1810 reduces gradually to correspond to a second distance range, the processor 270 may control the display unit 251, so that the content item 1820 moves from the third display layer 943 to the second display layer 942. The second distance range may be smaller than the third distance range.

When the content item 1820 is moved from the third display layer 943 to the second display layer 942, the processor 270 may control the display unit 251 to change at least one of size, shape, transparency, and color of the content item 1820.

Figure 18C:
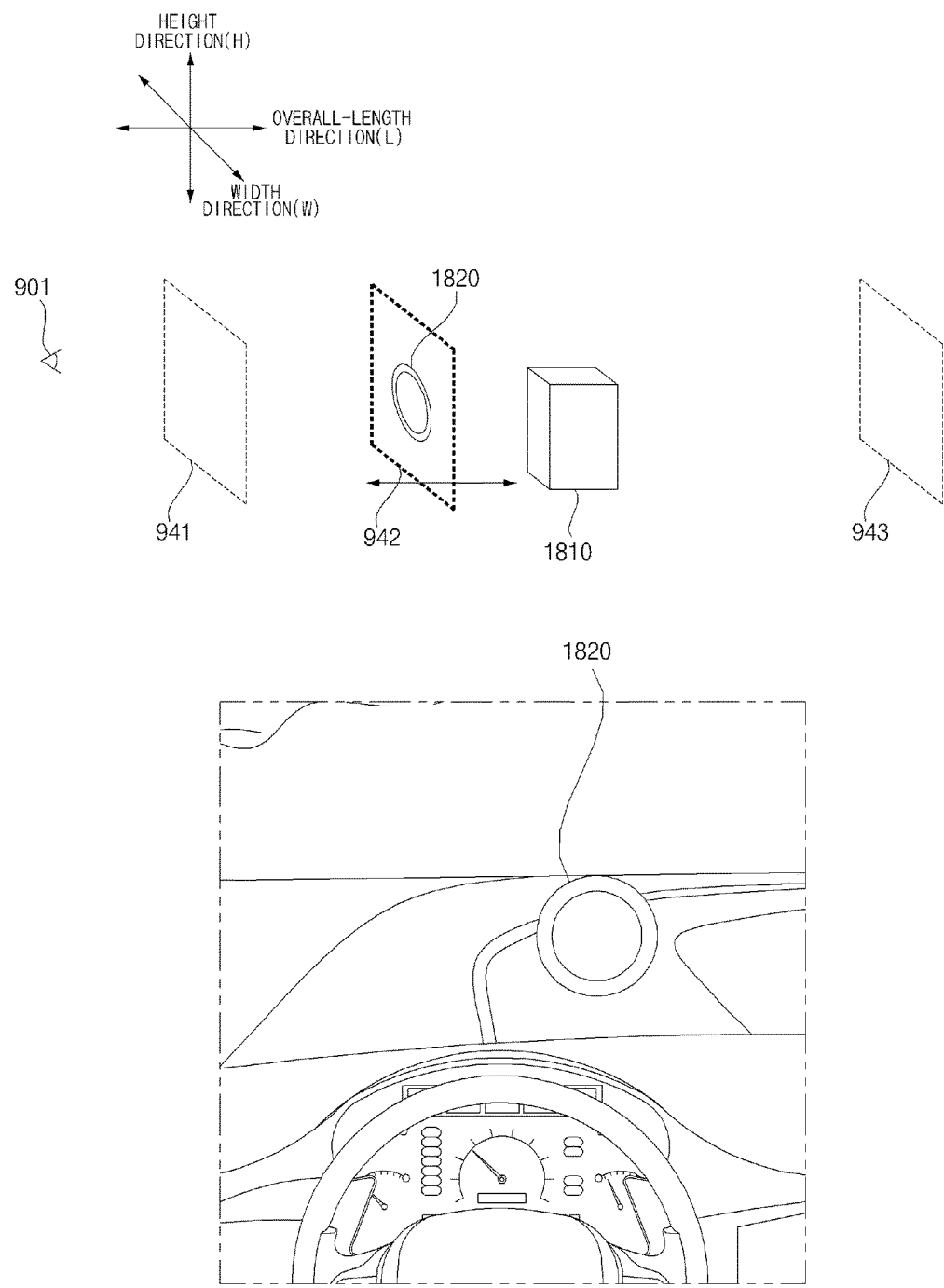
Figure 18D:
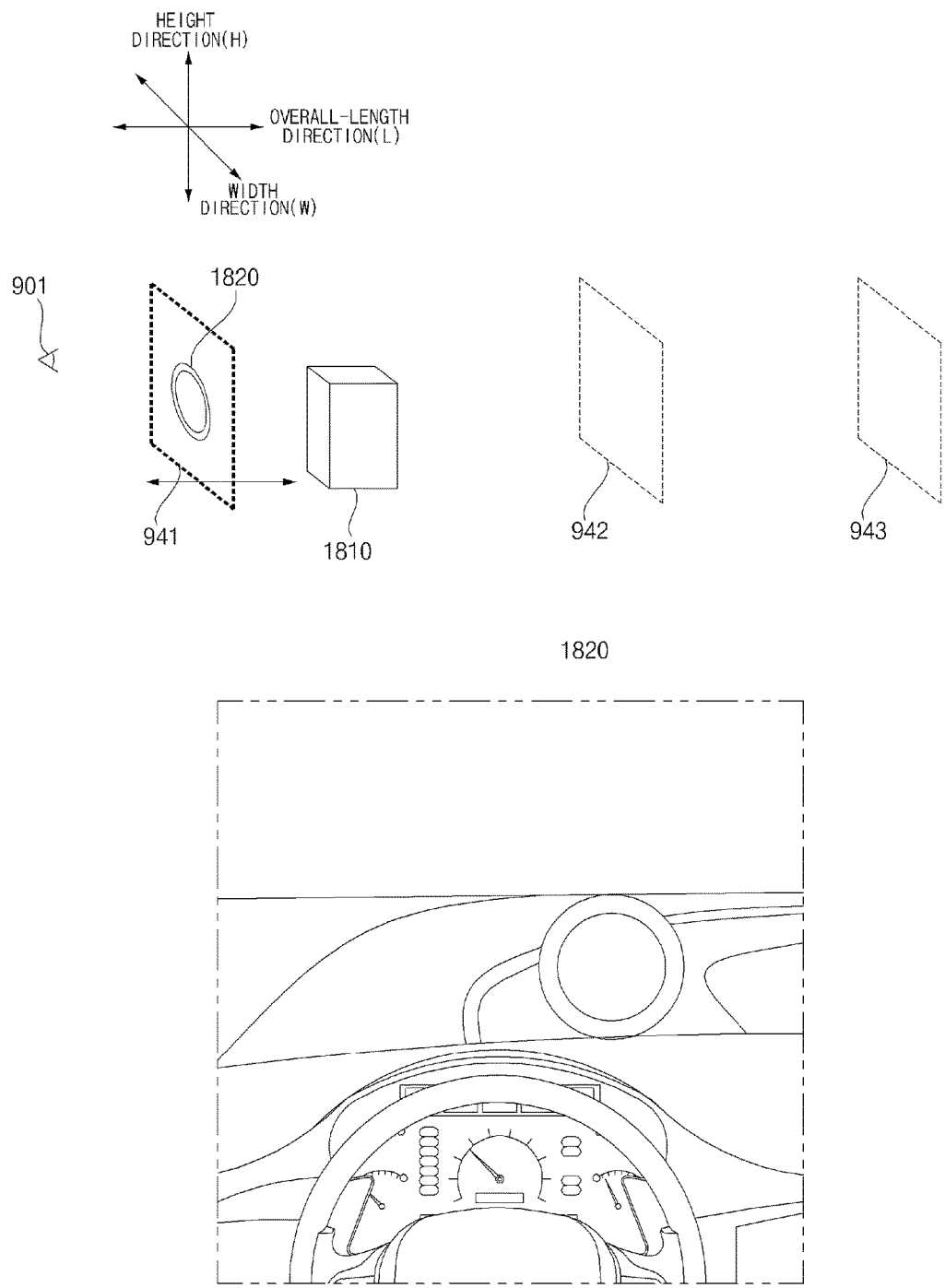

Next, as illustrated in FIG. 18C, as the distance between the vehicle 100 and the object 1810 reduces gradually within the second distance range, the processor 270 may adjust the virtual distance of the second display layer 942 so that the virtual distance reduces gradually.

As the virtual distance of the second display layer 942 reduces gradually, the user 901 may feel that the content item 1820 gradually moves toward the vehicle 100 or the user 901.

Next, as illustrated in FIG. 18B, if the distance between the vehicle 100 and the object 1810 reduces gradually to correspond to a first distance range, the processor 270 may control the display unit 251, so that the content item 1820 moves from the second display layer 942 to the first display layer 941. The first distance range may be smaller than the second distance range.

When the content item 1820 is moved from the second display layer 942 to the first display layer 941, the processor 270 may control the display unit 251 to change at least one of size, shape, transparency, and color of the content item 1820.

As the distance between the vehicle 100 and the object 1810 reduces gradually within a first distance range, the processor 270 may adjust a virtual distance of the first display layer 841 so that the virtual distance reduces gradually.

As the virtual distance of the first display layer 941 reduces gradually, the user 901 may feel that the content item 1820 gradually moves toward the vehicle 100 or the user 901.

Meanwhile, the information about the object 1810 may include information about a slope located in a driving lane ahead, information about a curve, and information about a circular intersection.

The processor 270 may control the display unit 251 to adjust a virtual distance of each of the multiple display layers 941, 942, and 942 based on information about a distance between the vehicle 100 and the slope, information about a distance between the vehicle 100 and the curve, and information about a distance between the vehicle 100 and the circular intersection.

Figure 19A:
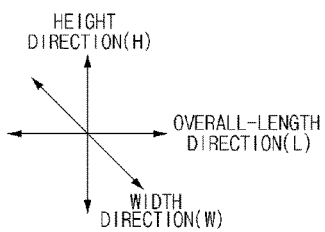
FIGS. 19A and 19B are diagrams for explanation of an operation of adjusting a virtual distance based on traffic volume information, according to an embodiment of the present invention.
Figure 19A:
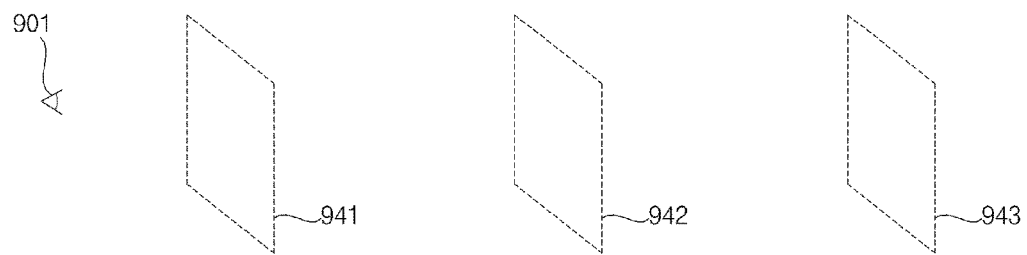
Figure 19A:
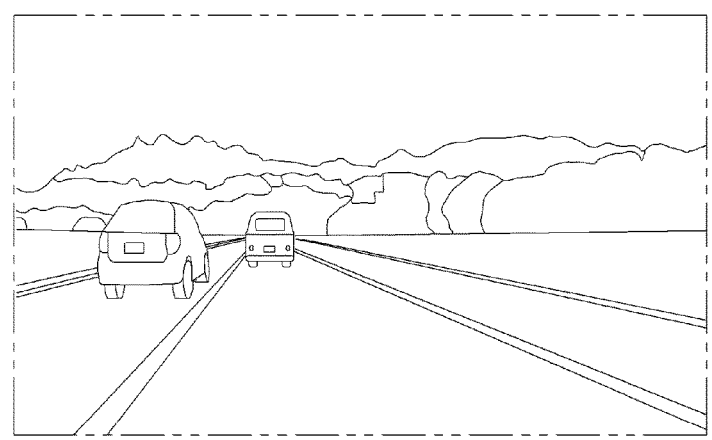
Figure 19B:
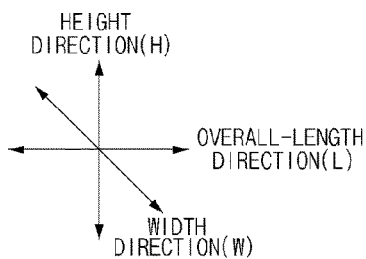
Figure 19B:
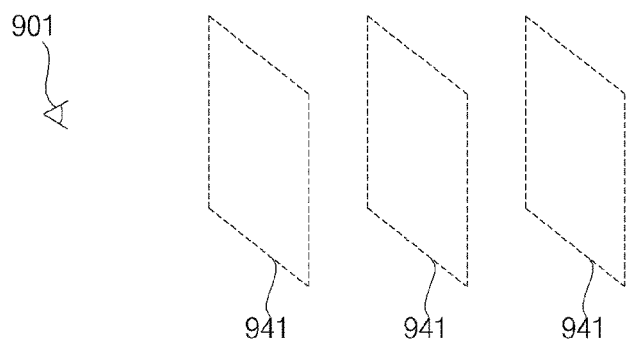
Figure 19B:
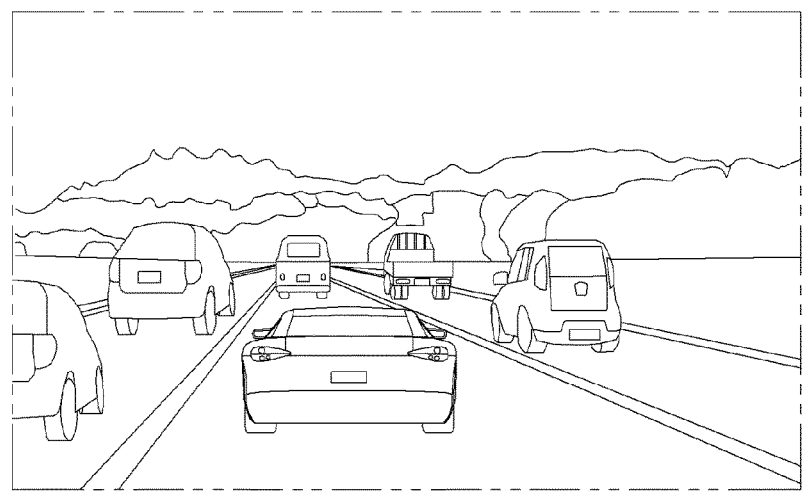

FIGS. 19A and 19B are diagrams for explanation of an operation of adjusting a virtual distance based on traffic volume information, according to an embodiment of the present invention.

Referring to the drawings, the processor 270 may receive traffic volume information through the interface unit 245.

The processor 270 may adjust a virtual distance of each of the multiple display layers 941, 942, and 943 based on the traffic volume information.

As illustrated in FIG. 19A, the processor 270 may control the display unit 251, so that the lower the traffic volume, the greater the virtual distance of each of the multiple display layers 941, 942, and 943.

The processor 270 may adjust a virtual distance of each of the multiple display layers 941, 942, and 943, so that the lower the traffic volume, the greater the gap between the multiple display layers 941, 942, and 943.

If the traffic volume is low, an event is less likely to occur in a short distance. In this case, upon an event occurring in a long distance, it is possible to cause the virtual distance to increase.

As illustrated in FIG. 19B, the processor 270 may control the display unit 251, so that the higher the traffic volume, the shorter the virtual distance of each of the multiple display layers 941, 942, and 943.

The processor 270 may adjust a virtual distance of each of the multiple display layers 941, 942, and 943, so that the higher the traffic volume, the shorter gap between the multiple display layers 941, 942, and 943.

If the traffic volume is high, various events may occur in the vicinity. In this case, upon a variety of events possibly occurring in the vicinity, it is possible to cause the virtual distance to reduce.

Figure 20A:
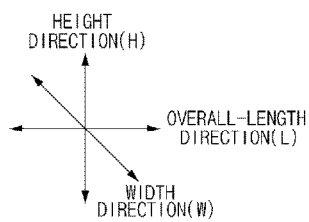
FIGS. 20A and 20B are diagrams for explanation of an operation of adjusting a virtual distance based on driving speed information, according to an embodiment of the present invention.
Figure 20A:
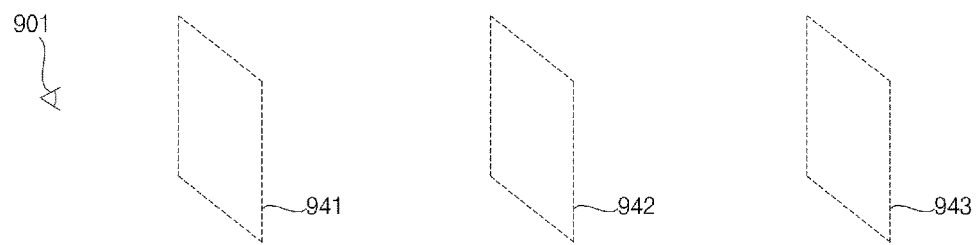
Figure 20A:
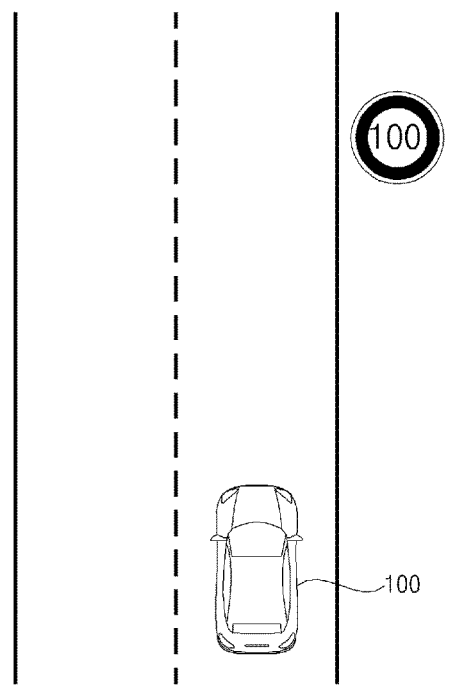
Figure 20B:
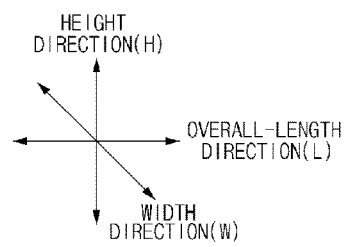
Figure 20B:
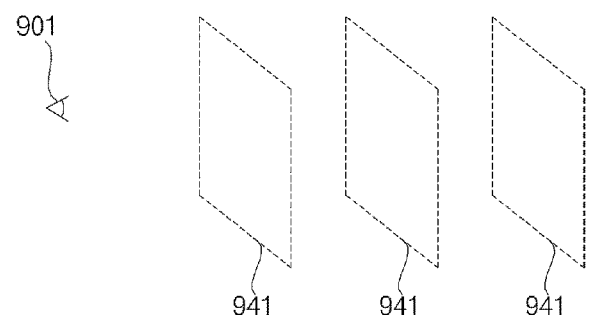
Figure 20B:
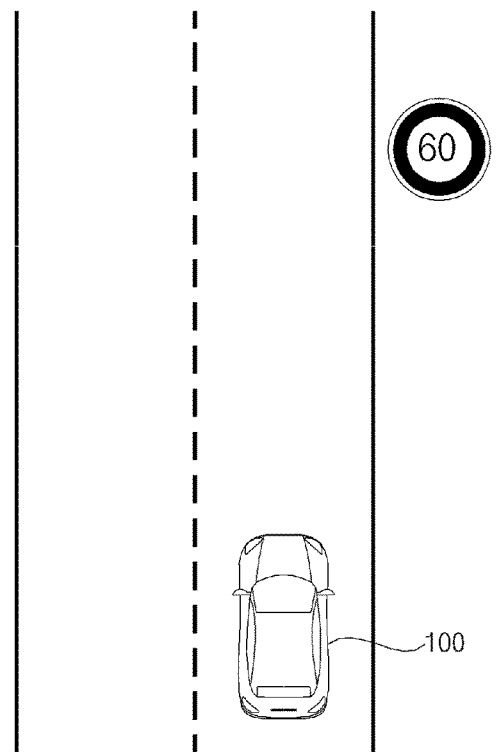

FIGS. 20A and 20B are diagrams for explanation of an operation of adjusting a virtual distance based on driving speed information, according to an embodiment of the present invention.

Referring to the drawings, the processor 270 may receive driving speed information through the interface unit 245.

The processor 270 may adjust a virtual distance of each of the multiple display layers 941, 942, and 943 based on the driving speed information.

As illustrated in FIG. 20A, the processor 270 may control the display unit 251, so that the greater the driving speed of the vehicle 100, the greater the virtual distance of each of the multiple display layers 941, 942, and 943.

The processor 270 may adjust a virtual distance of each of the multiple display layers 941, 942, and 943, so that the greater the driving speed of the vehicle 100, the greater the gap between the multiple display layers 941, 942, and 943.

If a value indicative of a driving speed is great (for example, if the vehicle 100 is travelling on highway), an event is less likely to occur in a short distance. In this case, upon an event occurring in a long distance, it is possible to cause the virtual distance to increase.

As illustrated in FIG. 20B, the processor 270 may control the display unit 251, so that the smaller the driving speed of the vehicle 100, the shorter the virtual distance of each of the multiple display layers 941, 942, and 943.

The processor 270 may adjust a virtual distance of each of the multiple display layers 941, 942, and 943, so that the lower the driving speed of the vehicle 100, the shorter the gap between the multiple display layers 941, 942, and 943.

If a value indicative of a driving speed is small (for example, if the vehicle 100 is travelling in the downtown), a variety of events may occur in a short distance. In this case, upon a variety of events possibly occurring in a short distance, it is possible to cause the virtual distance to reduce.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus for a vehicle, comprising:
an interface unit configured to facilitate exchange of information, data, or a signal across the vehicle;
a display unit configured to implement multiple display layers each having a respective virtual distance;
a processor; and
a non-transitory computer-readable medium coupled to the processor having stored thereon instructions which, when executed by the processor, causes the processor to perform operations comprising:
receiving, through the interface unit, driving situation information of the vehicle comprising information about an object located in front of the vehicle, the information about the object comprising a distance between the vehicle and the object;
instructing the display unit to vary the respective virtual distances of the multiple display layers based on the driving situation information,
wherein the multiple display layers comprise a first display layer having a first virtual distance and a second display layer having a second virtual distance, and
wherein the first virtual distance and the second virtual distance are modified based on the information about the distance between the vehicle and the object;
instructing the display unit to display a first content item on the second display layer; and
instructing the display unit to move the first content item from the second display layer to the first display layer based on the information about the distance between the vehicle and the object.

2. The user interface apparatus of claim 1, wherein the multiple display layers further comprise a third display layer having a third virtual distance.

3. The user interface apparatus of claim 1, wherein the operations comprise instructing the display unit to display a first content item on the first display layer and a second content item on the second display layer.

4. The user interface apparatus of claim 3, wherein the operations comprise instructing the display unit to position the first content item and the second content item such that the first and second content items overlap from a point of view of a driver.

5. The user interface apparatus of claim 3, wherein the operations comprise instructing the display unit to make the second content item appear out of focus.

6. The user interface apparatus of claim 5, wherein:
the driving situation information comprises first information and second information;
the first information has an importance level set higher than an importance level of the second information; and
the operations comprise generating the first content item based on the first information and the second content item based on the second information.

7. The user interface apparatus of claim 3, wherein the operations comprise instructing the display unit to gradually fade in the first content item.

8. The user interface apparatus of claim 7, wherein the operations comprise instructing the display unit to gradually fade out the second content item after completion of or concurrently with the gradually fading in of the first content item.

9. The user interface apparatus of claim 3, wherein the operations comprise instructing the display unit to display the first content item or the second content item at a predetermined angle relative to a road surface.

10. The user interface apparatus of claim 9, wherein the operations comprise instructing the display unit to change the predetermined angle based on one or more of (i) a passage of time; (ii) a change in respective importance level of the first content item or the second content item; or (iii) driving speed information of the vehicle.

11. The user interface apparatus of claim 1,
wherein the second virtual distance is greater than the first virtual distance, and the operations comprise:
receiving, through the interface unit, a front-view image;
instructing the display unit to display a non-augmented reality content item on the first display layer; and
instructing the display unit to display an augmented-reality content item on the second display layer.

12. The user interface apparatus of claim 1, wherein the operations comprise instructing, based on the first content item being moved from the second display layer to the first display layer, the display unit to change at least one of size, shape, transparency, or color of the first content item.

13. The user interface apparatus of claim 1,
wherein the information about the object comprises information about a slope located on a road ahead, information about a curve, and information about a circular intersection, and
the operations comprise instructing the display unit to modify the first virtual distance or the second virtual distance based on information about a distance between the vehicle and the slope, information about a distance between the vehicle and the curve, and information about a distance between the vehicle and the circular intersection.

14. The user interface apparatus of claim 1, wherein the driving situation information comprises traffic volume information and the operations comprise instructing the display unit to modify the respective virtual distance of each of the multiple display layers based on the traffic volume information.

15. The user interface apparatus of claim 14, wherein the operations comprise instructing the display unit to gradually decrease the respective virtual distances in response to an increase in a traffic volume, and gradually increase the respective virtual distances in response to a decrease in the traffic volume.

16. The user interface apparatus of claim 1, wherein the operations comprise:
receiving, through the interface unit, driving speed information of the vehicle; and
instructing the display unit to modify the respective virtual distance of each of the multiple display layers based on the driving speed information.

17. A vehicle, comprising:
a plurality of wheels;
a power source configured to drive the plurality of wheels; and
a user interface apparatus for the vehicle comprising:
an interface unit configured to facilitate exchange of information, data, or a signal across the vehicle;
a display unit configured to implement multiple display layers each having a respective virtual distance;
a processor; and
a non-transitory computer-readable medium coupled to the processor having stored thereon instructions which, when executed by the processor, causes the processor to perform operations comprising:
receiving, through the interface unit, driving situation information of the vehicle comprising information about an object located in front of the vehicle, the information about the object comprising a distance between the vehicle and the object;
instructing the display unit to vary the respective virtual distances of the multiple display layers based on the driving situation information,
wherein the multiple display layers comprise a first display layer having a first virtual distance and a second display layer having a second virtual distance, and
wherein the first virtual distance and the second virtual distance are modified based on the information about the distance between the vehicle and the object;
instructing the display unit to display a first content item on the second display layer; and
instructing the display unit to move the first content item from the second display layer to the first display layer based on the information about the distance between the vehicle and the object.

* * * * *